United States Patent
May et al.

(10) Patent No.: US 9,778,103 B1
(45) Date of Patent: Oct. 3, 2017

(54) UV RADIOMETRY INSTRUMENTS AND METHODS

(71) Applicant: EIT, LLC, Sterling, VA (US)

(72) Inventors: Joe T. May, Leesburg, VA (US); Mark Lawrence, Frederick, MD (US)

(73) Assignee: EIT, LLC, Sterling, VA (US)

( * ) Notice: Subject to any disclaimer, the term of this patent is extended or adjusted under 35 U.S.C. 154(b) by 0 days.

(21) Appl. No.: 15/154,411

(22) Filed: May 13, 2016

(51) Int. Cl.
   *G01J 1/42* (2006.01)
   *G01J 1/04* (2006.01)
   *G01J 1/02* (2006.01)

(52) U.S. Cl.
   CPC .............. *G01J 1/429* (2013.01); *G01J 1/0271* (2013.01); *G01J 1/0474* (2013.01); *G01J 1/0488* (2013.01)

(58) Field of Classification Search
   CPC .. G01J 1/0488; G01J 1/04; G01J 1/429; G01J 1/0271
   See application file for complete search history.

(56) References Cited

U.S. PATENT DOCUMENTS

| | | | | |
|---|---|---|---|---|
| 5,382,799 A * | 1/1995 | May | ......................... | G01J 1/02 250/372 |
| 6,023,066 A | 2/2000 | Cain et al. | | |
| 6,278,120 B1 * | 8/2001 | May | ......................... | G01J 1/04 250/372 |
| 6,822,789 B2 | 11/2004 | Kuklinski | | |
| 7,049,602 B2 * | 5/2006 | Tokhtuev | .................. | G01J 1/02 250/372 |
| 7,554,093 B1 | 6/2009 | Ganopoulos et al. | | |
| 7,947,962 B2 | 5/2011 | Pelizzo et al. | | |
| 2003/0165613 A1 * | 9/2003 | Chappa | .................... | A61L 27/34 427/2.24 |
| 2004/0061069 A1 * | 4/2004 | Schalble | .................... | A61L 2/10 250/432 R |
| 2006/0151709 A1 * | 7/2006 | Hahl | ..................... | A61B 5/0071 250/372 |
| 2010/0206787 A1 * | 8/2010 | Rozenberg | .............. | C02F 1/325 210/96.1 |
| 2014/0116961 A1 * | 5/2014 | Bokermann | ............ | C02F 1/008 210/748.11 |
| 2014/0166590 A1 * | 6/2014 | Rozenberg | .............. | C02F 1/008 210/746 |
| 2016/0331314 A1 * | 11/2016 | Bhansali | .............. | A61B 5/4878 |

FOREIGN PATENT DOCUMENTS

EP         0074225         8/1982

* cited by examiner

*Primary Examiner* — Marcus Taningco
(74) *Attorney, Agent, or Firm* — Whitham, Curtis & Cook, P.C.

(57) ABSTRACT

Instruments and methods are disclosed which measure absolute energy and irradiance of UV light sources. The response curves of exemplary optical stacks of the radiometry instruments are substantially rectangular with steep transitions at the cutoff frequencies. Angle of incidence (AOI) control in combination with one or more interference filters in the optical stack enable the full optical stack to produce repeatable and accurate measurements. Inverse response filters are disclosed for leveling optical stack response.

19 Claims, 18 Drawing Sheets

UV RADIOMETRY INSTRUMENTS AND METHODS

FIELD OF THE INVENTION

The invention generally relates to the measurement and characterization of electromagnetic energy and, more specifically, radiometry instruments and methods suited for ultraviolet (UV) light.

BACKGROUND

Radiometry is a technology which involves the measurement of the amount energy which exists within a certain portion of an electromagnetic spectrum. Of particular interest is the measurement of the wavelengths from about 200 nanometers to 450 nanometers which are generally identified as the ultraviolet (UV) region. These wavelengths are used in numerous industrial processes over a very wide range of energy levels. Such measurements are challenging to make because optical component performance tends to be non-constant with wavelength. In addition, the measurements are susceptible to drift due to temperature, time, and variables often introduced during the data collection process in production/manufacturing environments or a lab environment. FIG. 1 shows the spectrum associated with a typical non-LED UV source.

The introduction of UV generating light-emitting diodes (LEDs) has produced a necessary change in UV energy measurement technology. UV LED radiometers measure the quantity of LED generated UV energy from a LED source. However, there have been numerous questions regarding the accuracy or, in some cases, the validity of the resulting measurements. The uncertainty is, in substantial part, a result of lack of formal definition of the portions of the spectrum being measured (spectral bands) and the lack of an instrument capable of making absolute energy measurements over specific bands of the defined spectrum. Most commercially available industrial radiometers describe their optical response in terms of their filter response only and not the total optical response of all optical components that energy passes through.

Generally, only a portion of the wavelengths in a given distribution are of interest. For example, in a curing process, the chemical reaction initiated by the ultraviolet energy occurs faster or slower according to the wavelength(s) of the UV energy impinged on it. The speed of the reaction is wavelength and irradiance dependent. A faster reaction, if it can produce the same desired results in the cured product, is generally better because it decreases processing time and, hence, reduces processing costs. Compromises are often made to achieve desired physical properties such as hardness, gloss, friction, color, and/or durability in the finished product. An ultimate objective is to be able to quantify the UV driven process so that the process can be documented and replicated.

FIG. 2 shows the optical absorbance curve of a typical photoinitiator. This can also be referred to as a curing sensitivity curve. The UV curing industry believes that optical absorbance of the photoinitiator is related to the ability of a given UV wavelength to generate free radicals in the photoinitiator and, hence, implement curing (polymerization). The exact relationship between absorbance and curing is not explicitly known, but it is generally agreed that different wavelengths have greater or lesser ability to implement curing than other wavelengths. It is this wavelength relationship that contributes to the need for UV radiometers to provide measurement of different and very specific wavelength ranges.

Different types of UV sources with different wavelengths are also used to achieve different properties in the product. For example, mercury-gallium bulbs are often used where depth of cure is needed, and mercury bulbs with enhanced shortwave UVC are used to achieve desired surface cure properties. As industrial manufacturers shift to using LED UV sources, there is a growing need for instruments and methods which can provide accurate measurements of non-LED and LED sources and permit their comparison in order to effectively transition equipment to LED UV sources.

Over the years, efforts have been made to measure the UV irradiance level and total UV energy impinged on a workpiece in order to implement proper curing. However, accurate and reproducible absolute measurements of energy and irradiance of UV sources has historically proved difficult if not impossible.

Radiometer manufacturers typically show only the spectral response of the bandpass filter alone and neglect optical response contributions by other components such as photodiode, diffuser, protective window, and attenuator. In the case of present day instruments, some of which use color interference bandpass filters, no provision is made for optical response changes caused by various factors including angle of incidence (AOI) factors. In the case of cut glass bandpass filters, angle of incidence factors are not as relevant. However, in both cut glass and color interference filter cases, the spectral response of the instrument is not rectangular. This is a shortcoming of existing instruments.

An instrument's response is substantially different from the filter response which manufacturers typically publish somewhat misleadingly as representing the overall optical response of their instrument(s). While this practice does not prevent the instruments from being used in a relative measurement mode, the results obtained can be much different from those obtained with a rectangular response and generally do not provide accurate irradiance and absolute energy measurements.

SUMMARY

Depending on the application, UV LED sources offer substantial advantages over traditional mercury lamp based sources. However, new LED technology necessitates some changes in UV band definitions and in the instruments and techniques used to measure and characterize UV energy.

New radiometric devices and methods are disclosed which are capable of making absolute energy and irradiance measurements over the spectral bands produced by UV LED sources. The new tools allow measurements made by different instruments on different sources to be compared more accurately with each other. Instruments and methods of the present invention provide an accurate, rectangular measurement response with excellent out-of-band rejection. This was not previously possible in non-laboratory (e.g., production) instruments.

Exemplary radiometers are configured to fulfill one or more (up to all) of the following:
  Be such size and geometry to fit conveniently in most industrial process machines
  Be easy to use in both lab and production environment by a wide range of operators
  Withstand harsh UV and temperature environments
  Establish and document a process in the lab
  Transfer the process to production and maintain it Enable communication within a company and between their facilities Enable communication between suppliers and customers UV Radiometers are instruments which are designed to measure the irradiance associated with certain portions of the spectrum which are used for UV curing, for example. Since curing speed is directly related to irradiance and wavelength, exemplary instruments are configured to measure only certain pre-selected UV wavelengths and to reject all other wavelengths, including both non-UV wavelengths and non-selected UV wavelengths.

Exemplary instruments are configured and sized to be placed in a UV environment and measure irradiance and total energy delivered by a UV source to a workpiece. The display may identify a selected wavelength band, time integrated UV energy (Joules/cm$^2$), and peak irradiance (Watts/cm$^2$), for example.

UV LED sources are usually characterized by a nominal center wavelength, Cp, which may vary by as much as +/−5 nm around nominal in a given source. UV LEDs have nearly identically shaped spectrums. As a result, each of the bands of energy from a given source can be measured by a radiometer whose bandwidth is about 50 nm. Thus, each of the presently identified LED bands, L405, L395, L385, and L365 can be accurately measured in like manner. Other bands, yet to be denoted, can be accommodated in like manner.

The spectral responsivity curve of an optical stack which utilizes a cut glass bandpass filter is non-linear and weights some wavelengths much more than others. This is undesirable. In preferred embodiments, optical stacks employ an interference filter as an optical bandpass filter.

Utilizing interference filters requires angle of incidence (AOI) control for proper functioning. Two proprietary AOI Control techniques are disclosed, referred to herein as the single plate method and the dual/double plate method.

Exemplary instruments use newly developed techniques which directly address the issues associated with obtaining rectangular optical response. This includes the use of an inverse response filter in the optical stack. An inverse response filter is provided in some exemplary embodiments to linearize the optical response of an optical stack. During design, the non-linearity of an initial optical stack is measured and a new filter, which has a response which is the inverse of the original nonlinear stack response, is added to the stack which then produces a linear overall response in the passband. While the development process tends to be iterative it has been demonstrated to be effective.

If the reciprocal and/or bandpass filter(s) are of the color interference type, a large choice of band pass wavelengths are available by design. However, steps must be taken to control angle of incidence to avoid deterioration of the filter response due to AOI considerations.

According to an aspect of some exemplary embodiments, a UV radiometer or optical stack of a UV radiometer is provided, comprising a protective window; a diffuser arranged to receive energy transmitted through the protective window; a bandpass interference filter arranged after or below the diffuser, wherein the bandpass interference filter is configured to pass pre-selected UV wavelengths and reject other wavelengths; a photodetector arranged to receive energy transmitted through the bandpass interference filter; and an angle of incidence (AOI) control plate either separating the diffuser and the bandpass interference filter or separating the bandpass interference filter and the photodetector. The AOI control plate is configured to restrict or select AOI for energy passing through the bandpass interference filter and reaching the photodetector to such value that wavelength shift is no greater than 2%, and the UV radiometer is configured to measure one or more of the absolute quantities of energy and irradiance associated with the pre-selected UV wavelengths of a UV source.

According to a further aspect of some exemplary UV radiometers or optical stacks, the AOI control plate is configured as a plate with an aperture of pre-selected diameter and height.

According to another aspect of some exemplary UV radiometers or optical stacks, the bandpass interference filter is configured to only pass a pre-selected band of size 50 nm or less.

According to yet another aspect of some exemplary UV radiometers or optical stacks, the protective window is configured as an attenuator, or the UV radiometer further comprises a purpose-built attenuator arranged to receive light transmitted through the protective window before it reaches the diffuser.

According to still another aspect of some exemplary UV radiometers or optical stacks, the instrument comprises an inverse response filter for linearizing or leveling a spectral response.

According to an aspect of further exemplary embodiments, a UV radiometer or optical stack of a UV radiometer is provided, comprising a protective window; a diffuser arranged to receive energy transmitted through the protective window; a bandpass interference filter arranged after or below the diffuser, wherein the bandpass interference filter is configured to pass pre-selected UV wavelengths and reject other wavelengths; a photodetector arranged to receive energy transmitted through the bandpass interference filter; a first angle of incidence (AOI) control plate separating the diffuser and the bandpass interference filter; and a second AOI control plate separating the bandpass interference filter and the photodetector. The first and second AOI control plates are configured to restrict or select AOI to such value that wavelength shift is no greater than 2%, and the UV radiometer is configured to measure one or more of the absolute quantities of energy and irradiance associated with the pre-selected UV wavelengths of a UV source.

According to a further aspect of some exemplary UV radiometers or optical stacks, the first and second AOI control plates are configured as plates with respective first and second apertures of pre-selected diameters and heights.

According to another aspect of some exemplary UV radiometers or optical stacks, the bandpass interference filter is configured to only pass a pre-selected band of size 50 nm or less.

According to yet another aspect of some exemplary UV radiometers or optical stacks, the first AOI control plate is mated with a first side of the bandpass interference filter, and the second AOI control plate is mated with a second side of the bandpass interference filter opposite the first side.

According to still another aspect of some exemplary UV radiometers or optical stacks, the first AOI control plate, bandpass interference filter, and second AOI control plate form a sandwich structure 0.1 to 0.2 inch in size.

According to yet another aspect of some exemplary UV radiometers or optical stacks, the protective window is configured as an attenuator, or the UV radiometer or optical stack further comprises a purpose-built attenuator arranged to receive light transmitted through the protective window before it reaches the diffuser.

According to still another aspect of some exemplary UV radiometers or optical stacks, the instrument comprises an inverse response filter for linearizing or leveling a spectral response.

According to an aspect of further exemplary embodiments, a radiometry method is disclosed for measuring absolute energy and irradiance of a UV source, comprising steps of admitting energy originating from the UV source to an optical stack using a protective window; diffusing energy from the protective window using a diffuser; filtering energy from the diffuser with a bandpass interference filter configured to pass pre-selected UV wavelengths and reject other wavelengths; detecting energy from the bandpass interference filter using a photodetector; controlling the angle of incidence (AOI) of energy passing through the bandpass interference filter and reaching the photodetector using one or more AOI control plates, each plate either separating the diffuser and the bandpass interference filter or separating the bandpass interference filter and the photodetector; and determining one or more of the absolute quantities of energy and irradiance associated with the pre-selected UV wavelengths of the UV source based on an output of the photodetector. The AOI is restricted or selected in the controlling step to such value that wavelength shift is no greater than 2%.

According to a further aspect of some exemplary radiometry methods, the method comprises a step of attenuating light originating from the UV source using one or more of the protective window and a purpose-built attenuator.

According to yet another aspect of some exemplary radiometry methods, the admitting step admits light from a UV source that is a UV LED.

According to still another aspect of some exemplary radiometry methods, the method comprises a step of linearizing or leveling a spectral response using an inverse response filter.

According to an aspect of further exemplary embodiments, a radiometry method is provided for characterizing a UV source, comprising steps of transmitting energy from the UV source through an optical stack comprising a bandpass interference filter configured to pass pre-selected UV wavelengths and reject other wavelengths; and determining one or more of the absolute quantities of energy and irradiance associated with the pre-selected UV wavelengths of the UV source based on an output of a photodetector of the optical stack. The transmitting step conducts the energy from the UV source to the photodetector over an optical stack distance of 0.5 inch or less.

According to another aspect of some exemplary radiometry methods, the step of transmitting comprises transmitting energy from the UV source through a diffuser; transmitting energy from the diffuser through a first angle of incidence (AOI) control plate; transmitting energy from the first AOI control plate through the bandpass interference filter; transmitting energy from the bandpass interference filter through a second AOI control plate; and transmitting energy from the second AOI control plate to the photodetector.

According to still another aspect of some exemplary radiometry methods, the method comprises a step of attenuating light originating from the UV source using one or more of a protective window and a purpose-built attenuator prior to energy reaching the diffuser.

According to yet another aspect of some exemplary radiometry methods, the method comprises a step of linearizing or leveling a spectral response with an inverse response filter.

DETAILED DESCRIPTION

Figure 1:
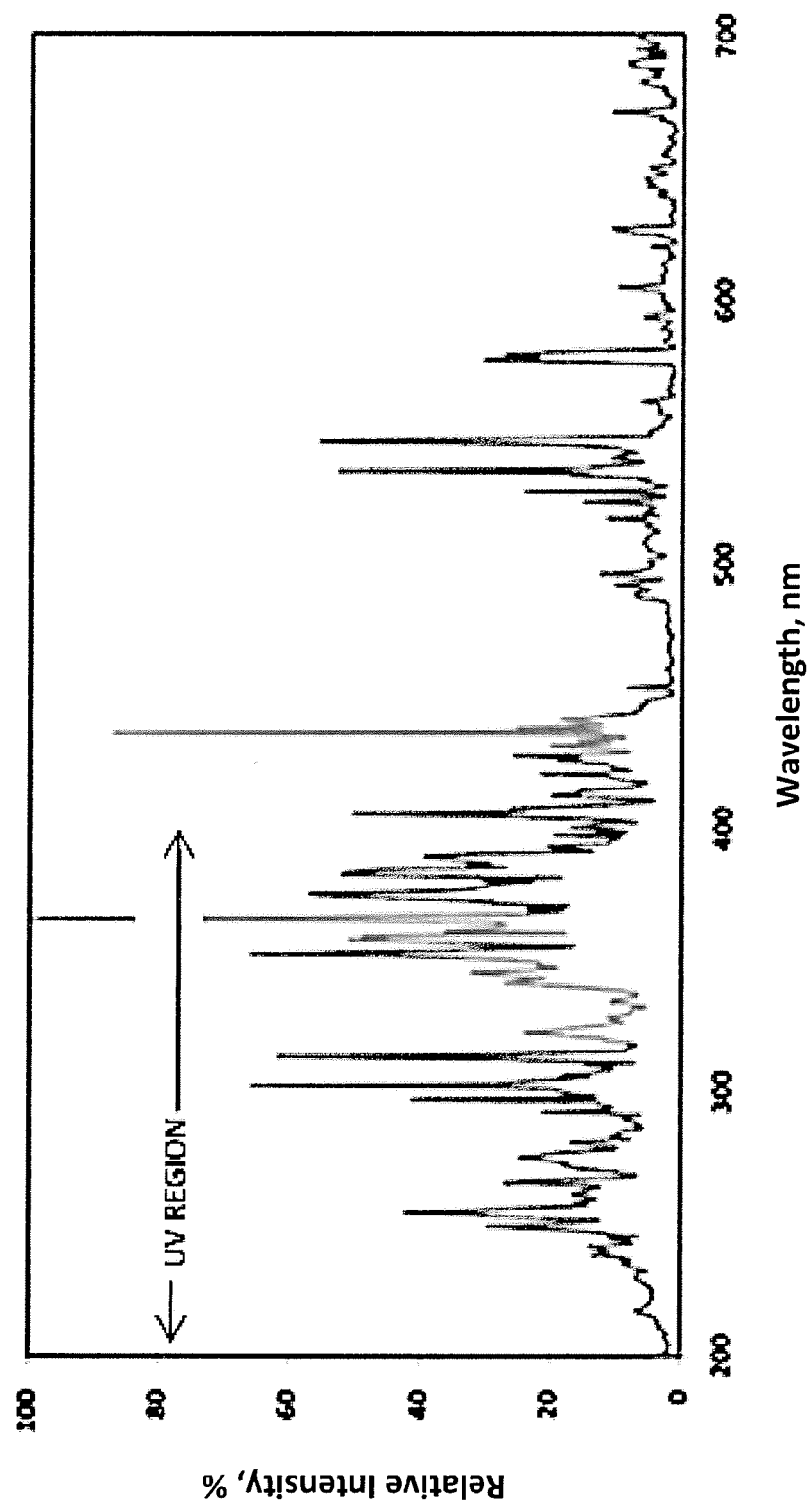
FIG. 1 is a representative spectrum for an HgFe arc lamp source.
Figure 2:
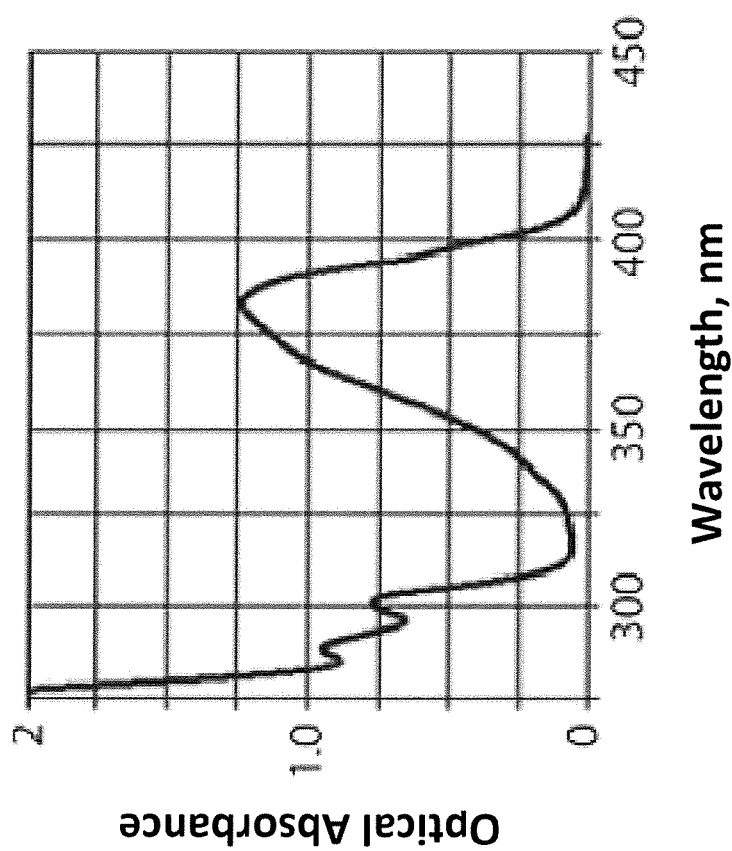
FIG. 2 is a representative graph of optical absorbance versus wavelength for a representative photoinitiator.

As used herein, "light" is defined as electromagnetic radiation. The term "light" does not inherently imply "only visible light." Wavelengths associated with visible light may be included or excluded from the term "light" depending on the context of the term's use. In general, most instances of the use of "light" or "energy" means propagating electromagnetic radiation consisting of or at least comprising some UV wavelengths.

As used herein, the term "interference filter" includes so-called color interference filters or other interference-type filters.

As used herein, "responsivity curve", "response curve", "optical response", "optical response curve", "spectral response", and similar expressions for describing the behavior of an optical component or an optical stack are generally treated as equivalent terms and may be used interchangeably.

"Size", in reference to an optical stack, generally refers to the distance from the topmost/outermost surface of the top/first element in the stack to the surface of the photodetector which reacts to light impinging thereon. This measure is also the average distance which light must travel within the radiometer. "Size", in references to an element or component of an optical stack, refers to the distance between opposite outermost surfaces measured along a primary longitudinal axis of the optical stack unless context indicates otherwise. The terms "height" and "thickness" are both suitable alternatives and, as used herein, are interchangeable with "size" unless the context clearly indicates otherwise.

An "optical stack" may also be referred to as an "optical array", "series", "sequence" or similar term indicative of optical components arranged in a specific sequence for processing (e.g., filtering) light.

As used herein, "purpose-built" is used or usable to describe an element which is provided specifically for a primary capability or functionality implied by its name. For example, a "purpose-built attenuator" is an optical element specifically provided for attenuation. By comparison, a "protective window" can be accurately characterized as "an attenuator" if it performs attenuation, but it would not ordinarily be characterized as a "purpose-built attenuator". On a similar note, a "purpose-built attenuator" may in some embodiments provide some protection to other components, but it would not ordinarily be further characterized as a "purpose-built protective window". Purpose-built elements can, and in fact frequently do, have additional or supplemental functions or advantages beyond the primary purpose(s) for which they were built. As used herein, "purpose-built" and "purpose-provided" are treated as interchangeable and have the same meaning explained in this paragraph. Any element of an optical stack described herein can but does not necessarily have to be "purpose-built" for the functionality indicated or implied by its name. The alternative attribute of being "purpose-built" or not purpose-built should both be considered valid alternatives for optical elements described herein, regardless of whether they are discussed as being "purpose-built" or not.

Figure 3:
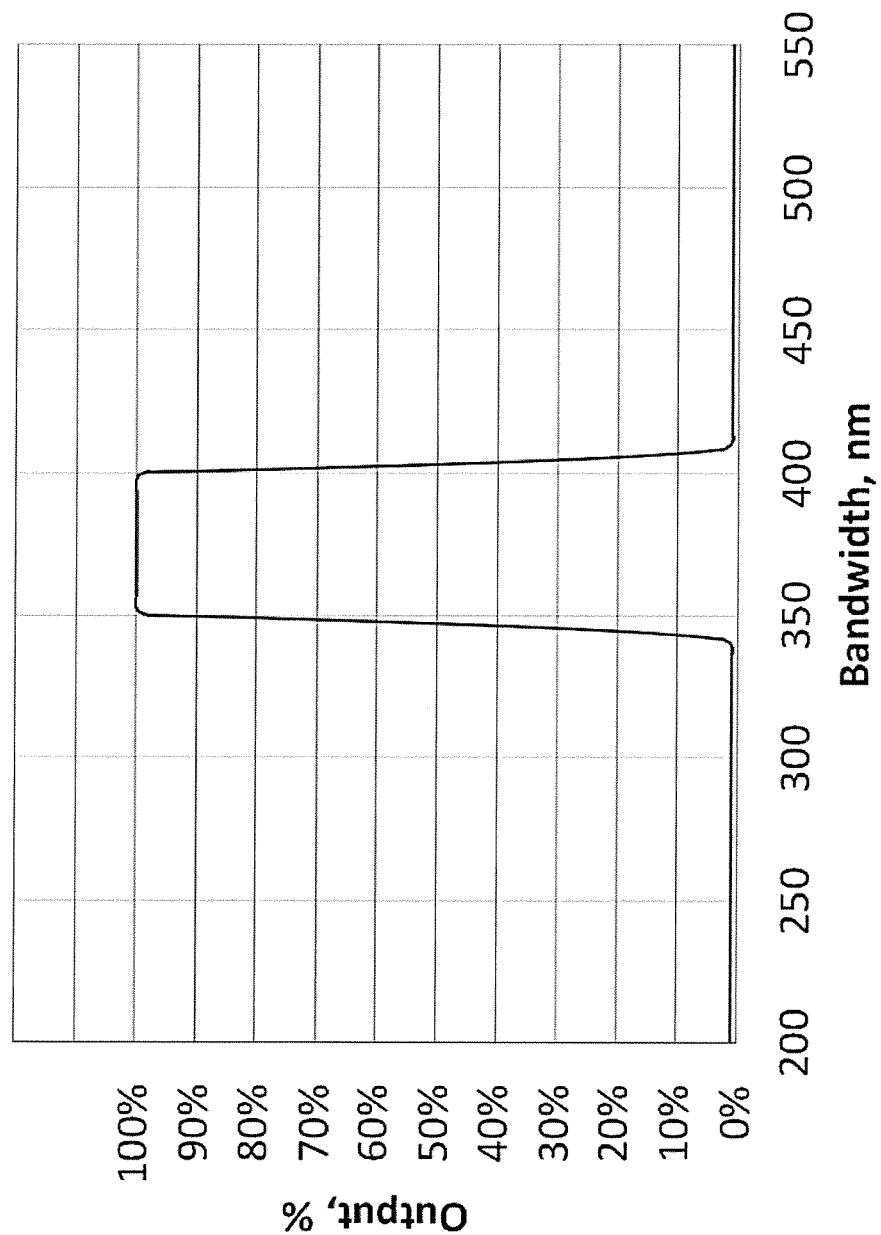
FIG. 3 is a representative ideal spectral response for a UV radiometer.

Referring now to the drawings, FIG. 3 shows an ideal spectral response for a radiometer. Ideally, the response is rectangular with a flat passband, very steep transition slopes from passband to out-of-band, and nearly zero response outside the passband. In the past, such a response has proved nearly impossible to achieve in actual real world radiometers, particularly in small packages.

Figure 4:
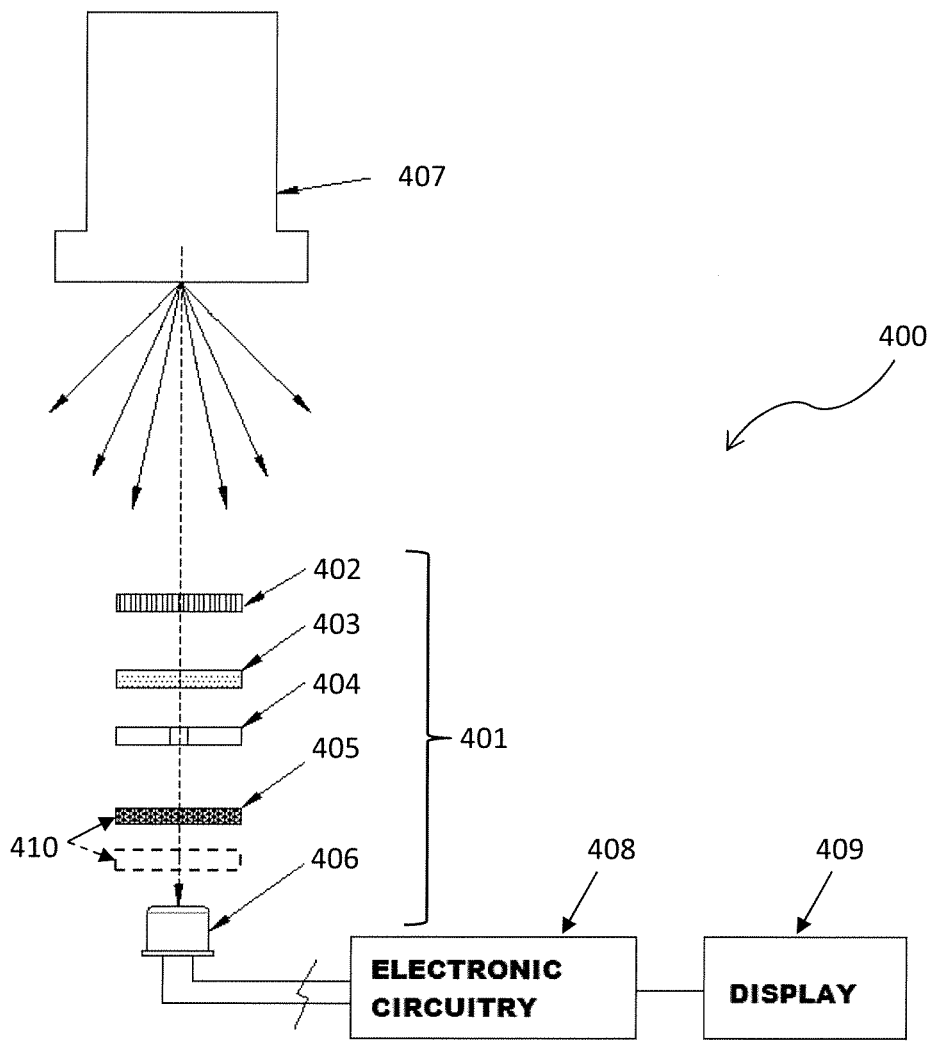
FIG. 4 is a schematic of a UV radiometer including an optical stack and its associated components according to an exploded view.

FIG. 4 is a schematic representation of an exemplary radiometer 400. The radiometer 400 comprises an optical stack 401. The optical stack 401 comprises a protective window 402 (which in this example also serves as an attenuator), diffuser 403, AOI control 404, optical filter 405, and photodetector 406. The optical filter 405 is, in some exemplary embodiments, an interference bandpass filter. The optical component generally referred to as angle of incidence (AOI) control 404 is generally embodied as one or more plates (i.e., an AOI control plate) which is configured to transmit only normal or near normal rays to the receiving surface of the bandpass filter. Element 410 is an inverse response filter and will be discussed in greater detail below.

Descriptions of the individual components within the optical stack 401 are contained in subsequent sections below. In operation, light (e.g., comprising or consisting of UV wavelengths) from a UV source 407 are impinged on the optical stack 401 so that desired wavelengths are allowed to pass through the stack and impinge on the photodetector 406. The wavelengths to be measured are converted to an electrical signal (e.g., a current signal) by the photodetector 406. The current signal is further converted by electronic circuitry 408 to an electrical signal (e.g., a voltage signal) suitable for measurement and output by the radiometer such as on display 409 and/or a nonvolatile memory for future recall and display.

The order of elements within optical instruments like radiometers is consequential to their performance. An optical stack comprising a series of elements (e.g., A, B, C, and D, in that order) cannot be assumed as having the same performance or response as another optical stack comprising the same elements but arranged in a different series (e.g., A, C, B, and D). In general, the combination of optical elements, furthermore in a specific sequence, can provide a synergistic effect that does not exist for the elements taken alone or assembled in some alternative and different sequence.

According to some exemplary embodiments which will be described herein, typically in connection with FIG. 4, a preferred sequence of elements is as follows:
 1. protective window (/attenuator)
 2. diffuser
 3. AOI control
 4. bandpass interference filter
 5. photodetector.

Based on this sequence, the protective window/attenuator is characterizable as the "first" or "topmost" element of the optical stack. Comparably, the photodetector is characterizable as the "last" or "bottommost" element of the optical stack. An optical element "higher" in the optical stack "precedes" an optical element "lower" in the optical stack. Note that the optical stack does not necessarily have to be vertically arranged in its environment. For example, the use of the terms "topmost" and "bottommost" can equally mean "leftmost" and "rightmost" in a particular environment. The vertical terminology is for ease of understanding and description and is not intended to limit the invention to a vertical arrangement in the environment of the radiometer.

According to an exemplary embodiment, a UV radiometer or optical stack of a UV radiometer comprises: a protective window; a diffuser arranged to receive light transmitted through the protective window; an angle of incidence (AOI) control plate arranged to receive light transmitted through the diffuser; a bandpass interference filter arranged to receive light transmitted through the AOI control plate; and a photodetector arranged to receive light transmitted through the bandpass filter.

It should be appreciated that language to the effect of "element Y receives light transmitted through element X" means that element Y is lower in the optical stack than element X. (This is the same as saying that element X is higher in the optical stack than element Y.) Elements X and Y may be adjacent to one another or, alternatively, one or more other elements may be arranged in between elements X and Y. Referring back to the numbered list above for illustrative example, it is accurate to say that the diffuser receives light transmitted through the protective window. It is just as accurate to say that the bandpass interference filter receives light transmitted through the protective window. Note that the diffuser and protective window are adjacent. However, the bandpass interference filter and protective window are not adjacent. Nevertheless, both the diffuser and bandpass interference filter are lower in the optical stack than the protective window, therefore both the diffuser and bandpass interference filter "receive light transmitted through the protective window". However, it is generally accurate to say that the diffuser and bandpass interference filter do not both receive precisely the same quantity (e.g., intensity) and wavelengths of light transmitted through the protective window. However, whatever ("portion" of) light each of these elements does receive, it was necessarily transmitted through the protective window prior to reaching the respective element.

Protective Window/Attenuator

The protective window/attenuator 402 (FIG. 4) is generally the first/topmost element of the optical stack 401. In operation, all of the wavelengths from the UV source 407 arrive at the outer surface of the protective window/attenuator 402. An exemplary protective window is configured to perform one or more (preferably all) of the following:

Pass all or most wavelengths,

Protect the components inside the instrument from external contamination, and

Attenuate energy levels which could damage the other optical components.

In some embodiments, an attenuator is arranged after the protective window as a separate and distinct element within the optical stack. In this case the protective window does not provide appreciable attenuation or, alternatively, provides attenuation supplemental to a purpose-built attenuator.

Figure 5:
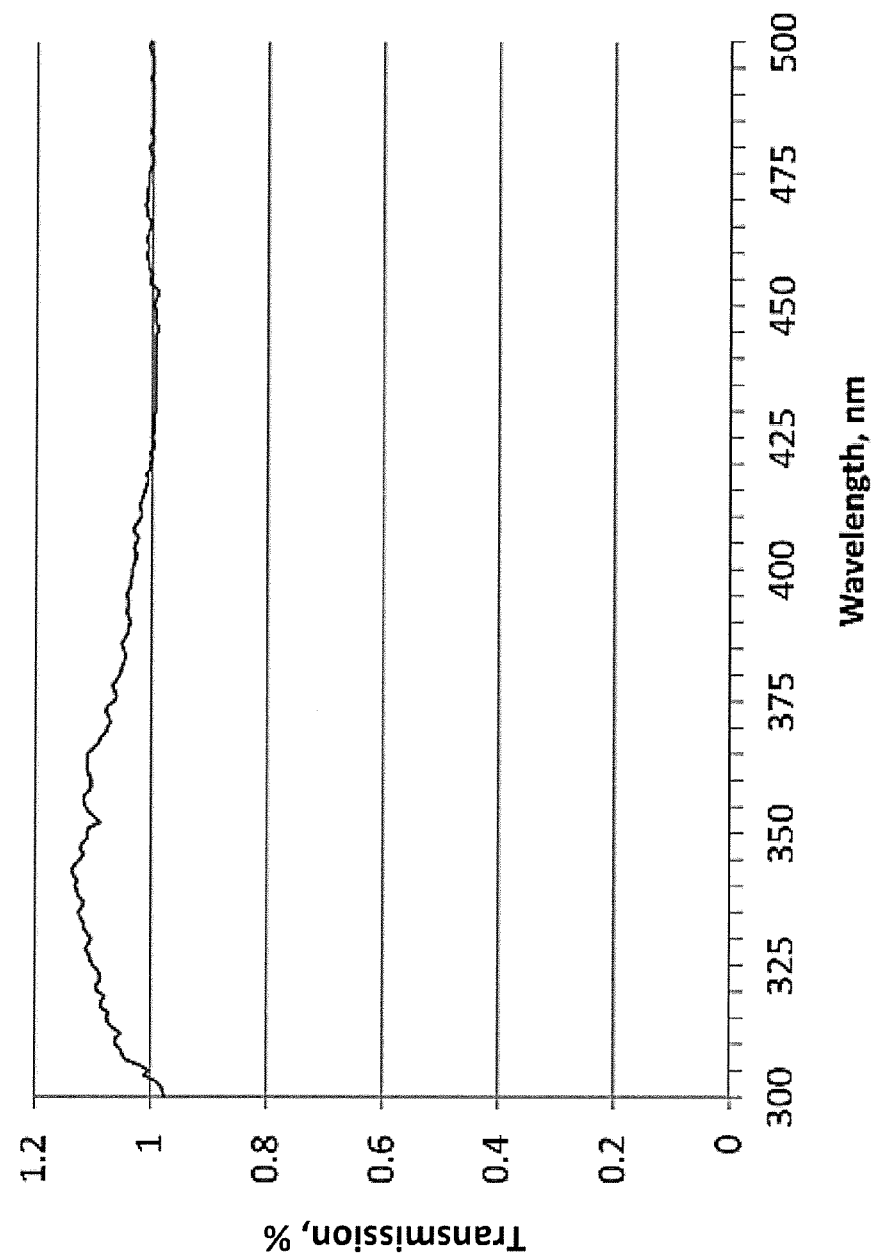
FIG. 5 is a representative transmission % versus wavelength curve for an attenuator.

FIG. 5 shows a representative transmission % versus wavelength curve for an attenuator or protective window/attenuator. An attenuator or protective window/attenuator has a nominal transmission percent of, for example, 1.0%, 2%, 5% or 10%. A practical range is 1%-50%. Attenuation is by a factor of, for example, 100 (1%), 50 (2%), or 10 (10%), or 2 (50%). Other transmission rates are possible and may be used for different embodiments in accordance with the invention. Attenuators suitable for incorporating into some embodiments of the invention are available from commercial suppliers such as, for example, Thorlabs Inc. (Newton, N.J.) and Newport Corporation (Irvine, Calif.). Attenuator designs suitable for manufacturing and incorporation into some embodiments are also available from EIT, LLC (Sterling, Va.).

Diffuser

Energy (e.g., UV, visible, and/or infrared) which passes through the protective window 402 falls on the diffuser 403 which transmits and diffuses the energy falling on its front face. The diffuser 403 also provides cosine response for the instrument. Coatings are thought to react in a cosine manner. Energy arriving perpendicular to the coating surface are assumed to be able to penetrate further than energy arriving at other than right angles.

Figure 6:
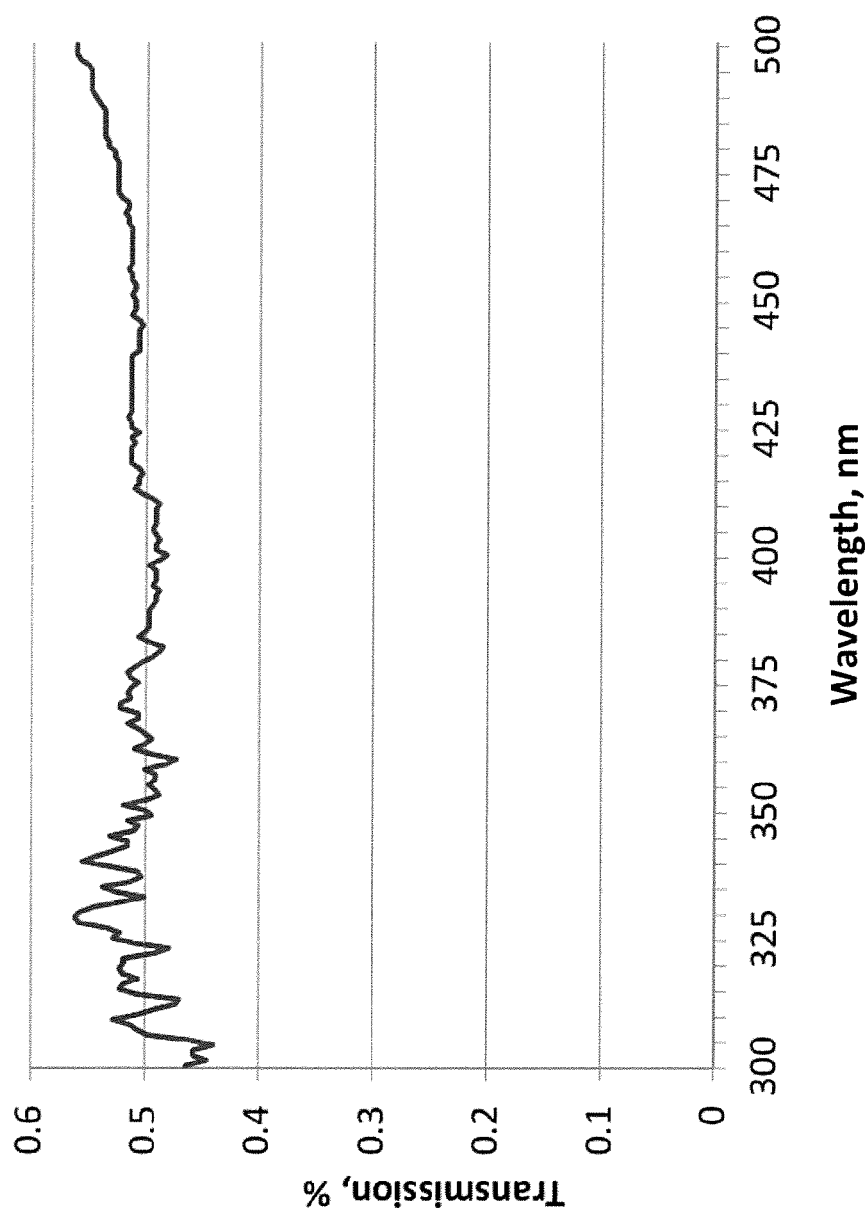
FIG. 6 is a representative transmission % versus wavelength curve for a diffuser.

FIG. 6 shows a representative transmission % vs wavelength curve for a diffuser. In general, diffusers have transmission values which vary with wavelength.

Suitable diffusers include, for example, a Lambertian diffuser, quartz diffuser, a plastic film such as polytetrafluoroethylene (e.g., Teflon™), or other known diffusers. Manufacturers and suppliers of diffusers or diffuser designs suitable for incorporating into some embodiments include, for example, Edmund Optics Inc. (Barrington, N.J.) and EIT, LLC (Sterling, Va.).

Angle of Incidence (AOI) Control and Optical Filters

Energy (e.g., UV rays) which pass through the diffuser 403 (FIG. 4) are impinged on an Angle of Incidence (AOI) control 404 (e.g., angle of incidence control plate). In some exemplary embodiments, the AOI control plate 404 is a small, opaque, (usually metallic) plate which contains a small (e.g., 0.005 to 0.010 inch) aperture (i.e., hole) near or at its center. The aperture reduces total energy to the filter 405/detector 406 combination to an acceptable level. The aperture also eliminates light leakage around the edge(s) of the filter(s). The transmission of the aperture is spectrally flat and requires no optical compensation in the stack 401. The aperture also performs an important optical function.

Energy passing through the AOI control 404 then strikes a bandpass filter 405 which is designed to transmit the selected wavelengths which are to be measured and to strongly reject all other wavelengths.

Exemplary include typically include one of two distinct bandpass filter types:

cut glass filter

Figure 7:
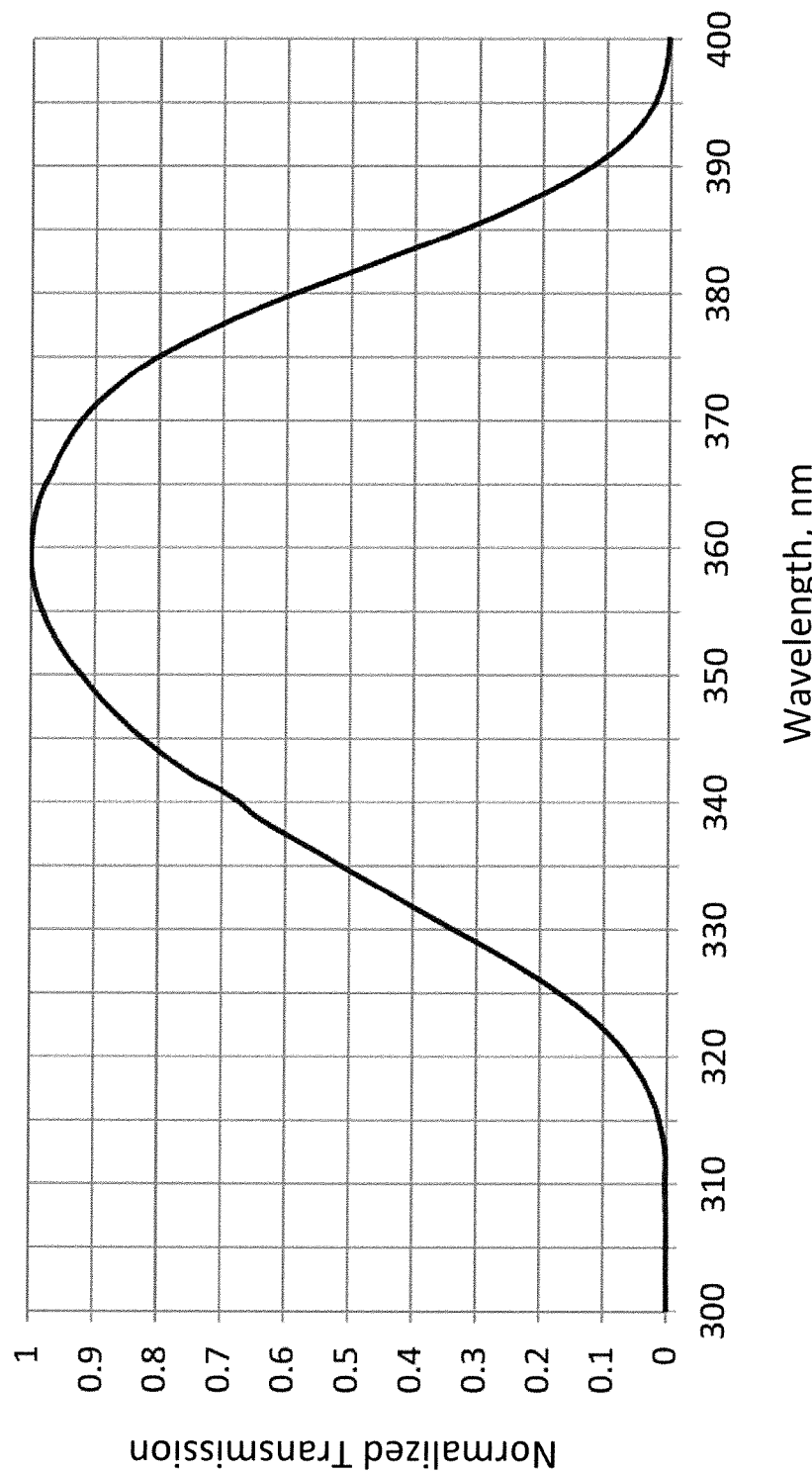
FIG. 7 is a transmission curve for a representative cut glass filter.

Cut glass type filters usually have transmission values which vary substantially over the wavelengths of interest. A typical transmission % versus wavelength plot for a cut glass filter is shown in FIG. 7. The response of cut glass filters is typically bell-shaped or at least non-rectangular as opposed to rectangular.

An advantage of cut glass filters is that they do not require AOI control. Therefore, instruments with cut glass filters as the bandpass filter can omit (i.e., be without) AOI control. However, the number of available cut glass optical responses is finite, and it is very likely that a less than optimal optical response will have to be accepted if cut glass is used.

Rectangular passband filter responses are nearly impossible to implement with cut glass filters, and adequate out-of-band responses are also difficult to obtain. In general, the overall optical stack response is a function of what cut glass filter responses are available rather than what filter response is desired or can be designed.

interference filter

Figure 8:
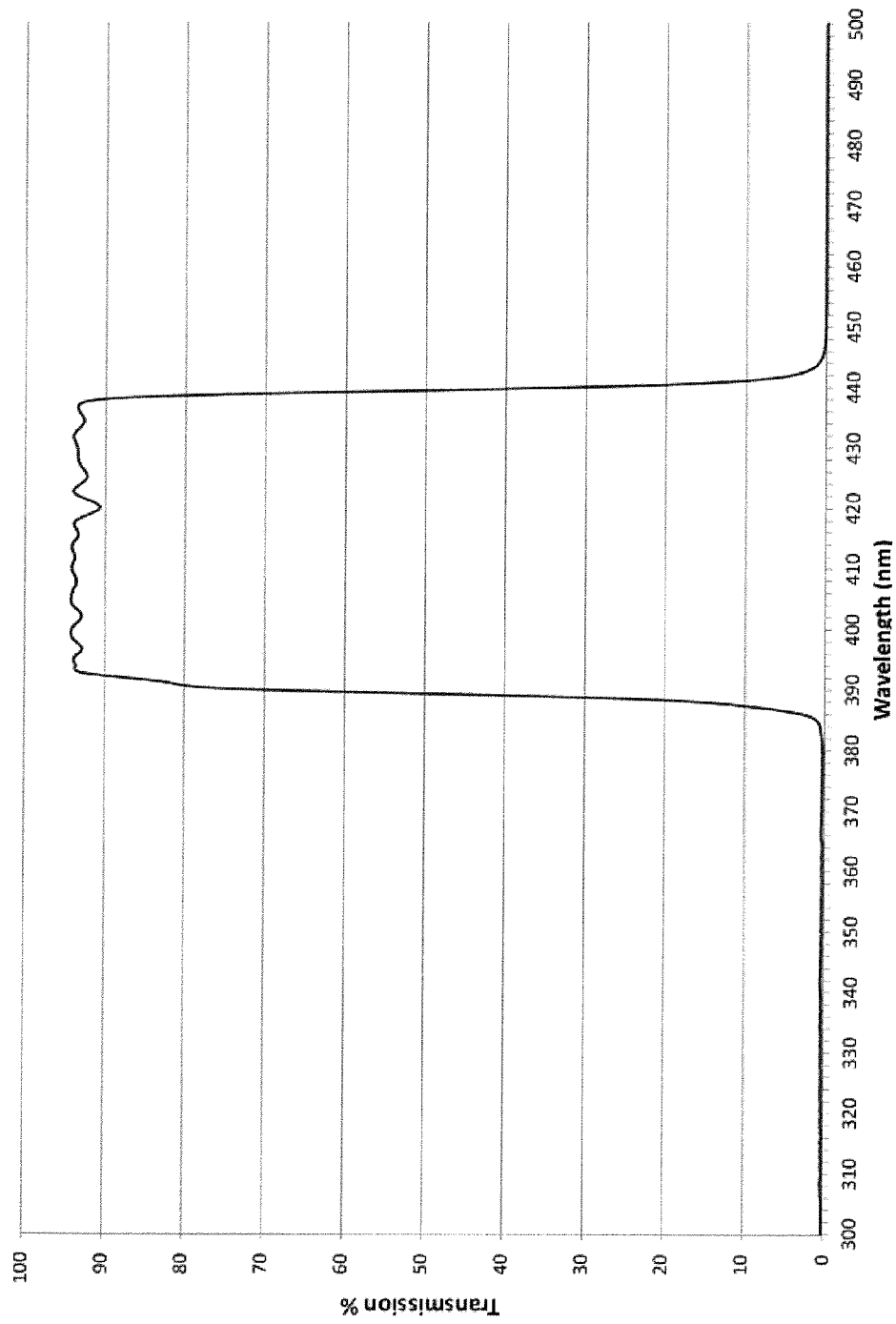
FIG. 8 is a transmission curve for a representative color interference filter.

In general, interference filters are preferred to cut glass filters. Interference filters can be designed and configured to provide good to excellent rectangular response in the passband and very good rejection outside of the passband. FIG. 8 shows a transmission % versus wavelength curve for a typical color interference filter. Note the excellent in-band response and out-of-band rejection, with steep transitions from passband to out-of-band. A change from near 100% transmission to near 0% transmission over a wavelength range of a few nanometers is considered a steep transition. In some embodiments, steep can be defined as a change from 90% to 10% transmission or 10% to 90% transmission over 5 nm or less, more preferably 4 nm or less. In a sample embodiment, a 90%-10% transmission was achieved over 2 nanometers.

Figure 9:
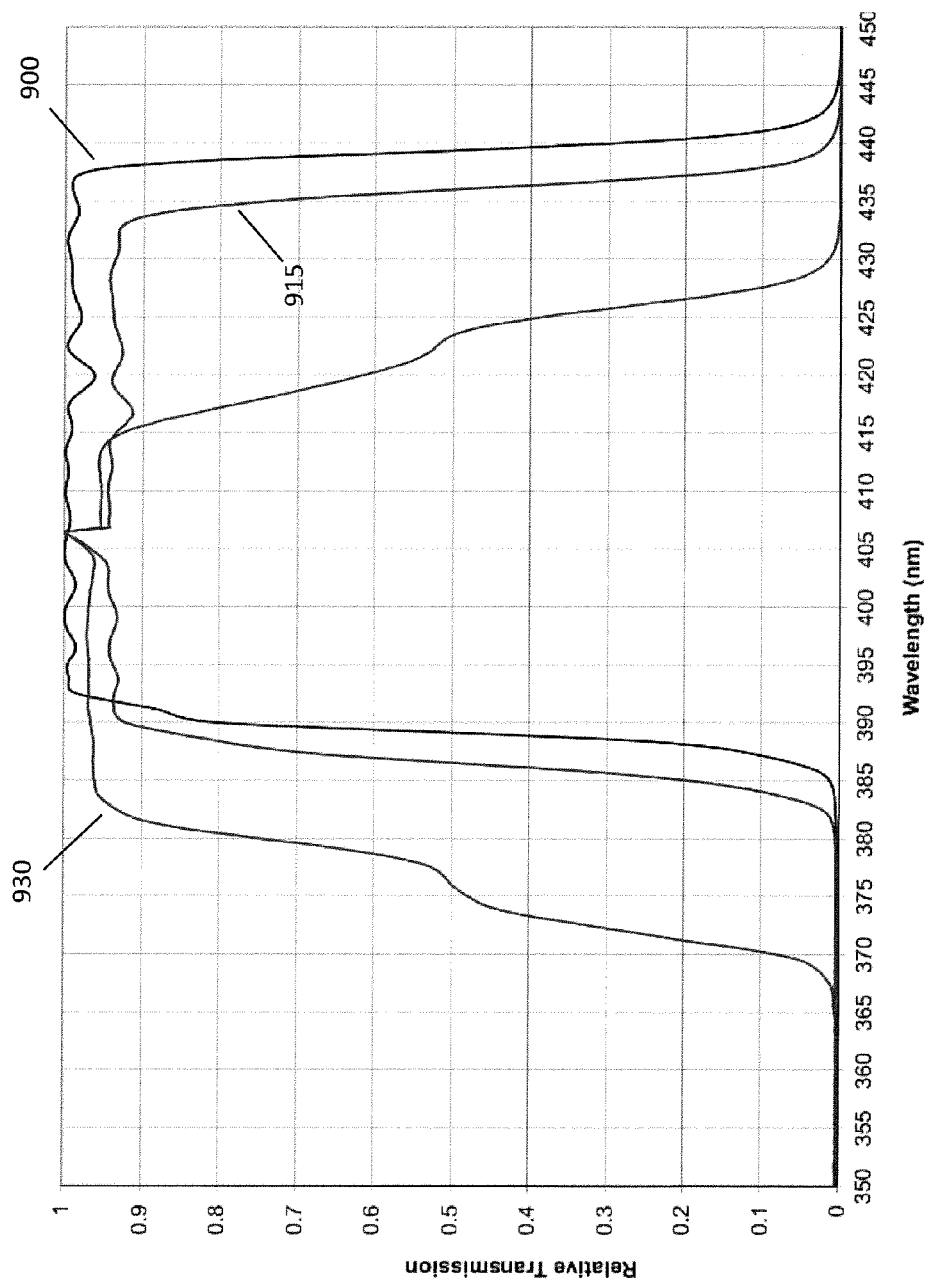
FIG. 9 is a representative color interference filter's response for different angles of incidence.

Although interference filters are generally preferred in exemplary embodiments, interference filter performance is significantly affected by the angle of incidence (AOI) of the light striking the filter. If the energy striking the front (i.e., top) surface of the filter is not close to normal (i.e., AOI of 0°), the response curve for that filter can be substantially altered (degraded). As an example, FIG. 9 illustrates the response curves for a representative interference filter when the energy incident on its front surface is at 0° (trace 900), 15° (trace 915), and 30° (trace 930) angle of incidence (AOI). There is a noticeable, dramatic shift in cutoff wavelengths as the AOI increases (e.g., angles >15°).

As already alluded to above, one exemplary method to limit angle of incidence (AOI) is with a single AOI control plate.

Figure 10:
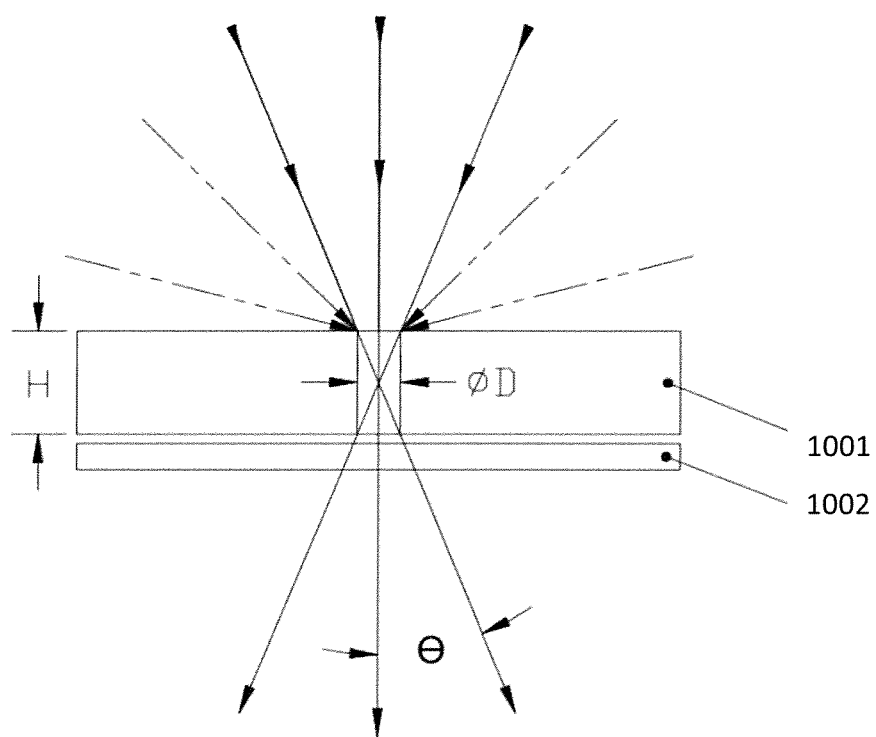
FIG. 10 is a single plate AOI control.

FIG. 10 is a schematic of a so-called single plate method for AOI control. The AOI control plate 1001 has a small circular through-hole (i.e., aperture) and is arranged above the receiving side of the bandpass filter 1002.

As discussed above in connection with FIG. 4, the AOI control plate 1001 is placed between the diffuser and the bandpass filter 1002 so that light impinges on the top surface of the aperture from every angle from 0° to ±90° because of light scattering by the diffuser which precedes it in the optical stack. The sides of the aperture are preferably blackened so that rays which strike the sides of the hole are absorbed. Only rays which strike at an angle of incidence, θ, between 0° and a certain predefined angle pass through to the bandpass filter 1002. By choosing the appropriate dimensions for D and H, as shown in FIG. 10, AOI can be limited to a value which provides adequate bandpass filter performance. The equation below defines the maximum value of AOI for a given set of aperture dimensions.

$$\theta = \tan^{-1} D/H$$

where:
θ=AOI=Angle of Incidence, max., degrees
D=diameter of hole in plate, inches
H=thickness of plate, inches
e.g., H=0.020 inches
   D=0.005 inches
   θ=14 degrees An alternative implementation for the single plate method is to arrange the angle of incidence control plate 1001 after the bandpass filter 1002. In other words, the plate 1001 is arranged to separate the bandpass filter and the photodetector. In this configuration, nearly all energy in the passband striking the bandpass filter enters the filter, regardless of AOI. However, the plate 1001 selectively transmits only those wavelengths which have an acceptable low AOI (e.g., 15° or less, 10° or less) with respect to the bandpass filter. Only that energy with selected AOI is permitted to completely pass through the bandpass filter and reach the photodetector. Accordingly, it is still accurate to refer to the plate 1001 as controlling AOI by selecting the AOI of energy that is actually measured by the optical stack.

Figure 11:
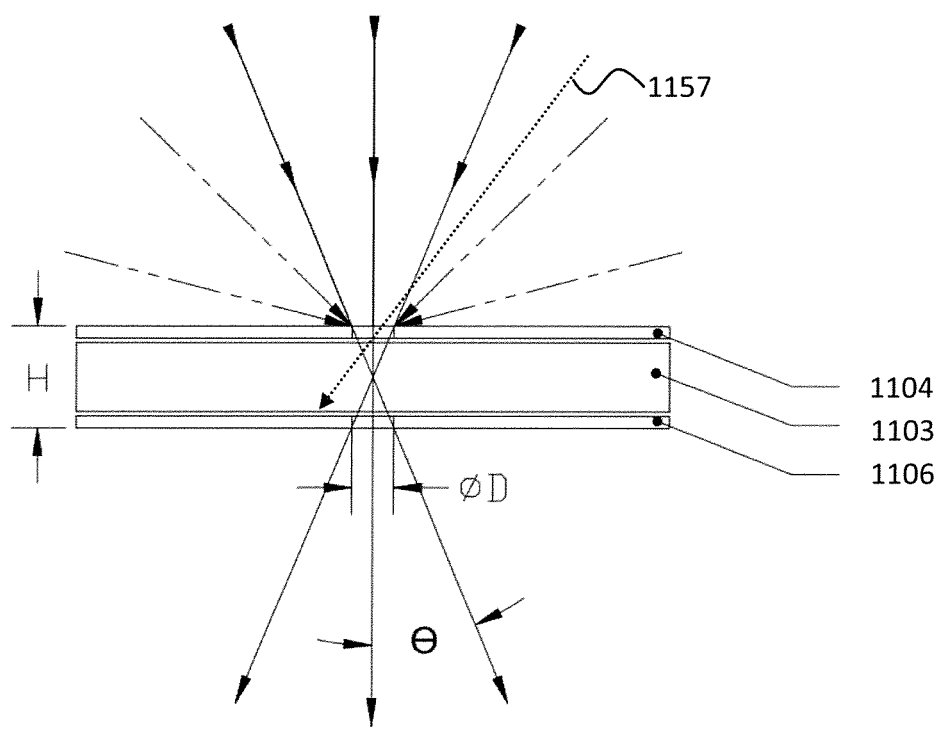
FIG. 11 is a double plate AOI control.

FIG. 11 is a schematic of another exemplary method to limit AOI, referred to as the double plate method. The double plate method (FIG. 11) has certain advantages over the single plate method (FIG. 10).

In the preceding paragraphs, a single plate containing a small aperture was described for controlling AOI. Size of the hole, D, and thickness of plate, H, considerations dictate a series of compromises. Hole size D must be large enough to admit a measurable amount of energy. However, the larger D is the thicker the plate H must be to maintain adequate AOI. Since space is generally at a premium in radiometers, it is desirable to keep the plate as thin as practicable. These are conflicting requirements and must be addressed carefully in choosing the dimensions of actual optical stack implementations.

The double plate method for implementing AOI control is preferred when sizing constraints are of highest priority. In the double plate method, the bandpass filter 1103 is sandwiched, top and bottom, with two, thin opaque plates 1104 and 1106 which each contain a small opening in a center area. The two holes are located on the same vertical axis. The first AOI control plate is mated with a first side of the bandpass interference filter, and the second AOI control plate is mated with a second side of the bandpass interference filter opposite the first side. Diffused energy strikes the first/top AOI control plate 1104 and energy with multiple angles of incidence are passed through the top aperture and strike the bandpass filter 1103. However, the only rays which pass through the filter 1103 that ultimately reach the photodetector lower in the optical stack are those rays normal or close to normal with the filter 1103 such that they pass through the aperture in the second/bottom AOI control plate 1106. The controlling equation is:

$$\theta \approx \tan^{-1} D_2/H$$

where:
θ=AOI=Angle of Incidence, max., degrees
$D_1$, $D_2$=diameter of holes in plate, inches
H=distance between top plate and lower plate, inches
e.g., $D_1 = D_2 = 0.010$ inches
   H=0.040 inches
   θ=14°

In the examples, the average angle of incidence is approximately 7° which results in small percentage changes in both cutoff wavelengths and passband transmission values.

In a given implementation or embodiment, it is possible to increase hole diameter in an AOI control plate, and hence increase the amount of energy, but still obtain adequate AOI control with no appreciable increase in thickness of the optical stack. This is particularly advantageous in such applications as low intensity, short wavelength measurements where energy levels are low and a relatively large diameter $D_1$ hole is required to obtain adequate energy levels to the photodetector. It is particularly advantageous to use the double plate method in small geometry radiometers to keep unit thickness to a minimum while providing AOI control. Both single plate and double plate methods have been experimentally tested and perform as described herein.

In the case of the double plate method (FIG. 11), the second AOI control plate 1106 is not directly restricting AOI to the top surface of the bandpass filter 1103 since it is arranged under the bandpass filter 1103. However, the plate 1106 does have the effect of selecting AOI for energy passing through the bandpass interference filter and ultimately reaching the photodetector. The plates 1104 and 1106 together control what light is ultimately permitted to pass completely through bandpass interference filter 1103 and reach the photodetector lower in the optical stack by a combination of restricting and selecting AOI. Some light which has an angle of incidence permitting it to pass through the first AOI control plate 1104 will enter the bandpass filter 1103 but will fail to pass through the second AOI control plate 1106 for lack of sufficiently small angle of incidence to the top surface of the bandpass filter 1103. Light wave 1157 in FIG. 11, for example, has an angle of incidence which permits entry into the bandpass filter 1103, yet the angle of incidence is too great to completely pass through the bandpass filter 1103 to reach to the photodetector lower in the optical stack owing to the control contributed by second AOI control plate 1106. The two plates 1104 and 1106 restrict or select AOI for energy passing through the bandpass interference filter and reaching the photodetector.

AOI control, as discussed in this disclosure, has notable distinctions over traditional collimators. Collimators are used in various optical devices to generate parallel or nearly parallel rays of light into a beam. The general configuration of a collimator is a long tunnel with a small cross-section and non-reflective walls. Only light waves which can pass through the entire tunnel without striking a wall are passed by the collimator. As such, collimators do have a limiting effect on the angle of incidence of light which is permitted to pass. However, traditional collimators have significant drawbacks. One considerable drawback is size. Collimators are often quite long in length, such as several feet or more. While a collimator that is, e.g., 5 or more feet long may be adequate for some laboratory settings, UV radiometers, especially those used in industrial settings, must be relatively small and compact in order to fit within the work space of industrial machines which use UV light (e.g., for curing). Even a length or diameter of 3 inches, for example, is too large a dimension for certain process control equipment. Exemplary optical stacks of radiometers according to the invention are very compact, especially when using double plate AOI control. For example, a total size (height) of an exemplary optical stack in accordance with FIGS. 4 and 11 is 0.2 inches. In general, some optical stacks have size (height) of at most 2 inches, preferably less 2 inches, more preferably 0.5 inch or less. A lower limit of 0.2 inch or 0.1 inch exists for cost and practical purposes. Sizes below 0.2 inch are achievable but can introduce disadvantages such as greater cost of production. A size of 0.25 inch is an exemplary size that balances objectives such as compactness, cost effectiveness, and ease of production. The compactness of the optical stack results in the radiometer conducting light from the UV source to the photodetector over a distance of less than 0.2 inches (or whatever size the optical stack). A single AOI control plate (FIG. 10) may be, for example, only 0.020 inch thick. For a pair of AOI control plates (FIG. 11), each plate may be, for example, 0.001 inch thick. The AOI control plates are preferably made as thin as reasonably possible without performance detriment. For context, example bandpass interference filter sizes are a thickness of 0.035 inch and a diameter of 0.37 inch. Other sizes are available. The overall objective is to keep the entire instrument size to a minimum. The entire instrument size (height) is typically within approximately 0.030 inch of the optical stack size.

A further advantageous feature of exemplary embodiments is an inverse response filter 410 (FIG. 4) for linearizing or leveling the response of the optical stack. According to an exemplary method of making the inverse response filter 410, the response curve is first measured (e.g., empirically) for the optical stack with the bandpass filter and with the AOI Control installed. From this measured response curve, a reciprocal response curve is determined. Specifications for the necessary reciprocal response are provided to a filter manufacturer for implementation. The resulting inverse response filter 410 is subsequently included in the complete optical stack as an integral part of the bandpass filter 405 (FIG. 4) or, alternatively, as a separate component in series with the original bandpass filter (e.g., either adjacent above or adjacent below the bandpass filter 405). This alternative implementation is illustrated using a broken arrow/lines in FIG. 4. The complete optical stack 401 with the inverse response filter included yields a flat overall response curve for the pass band of the entire optical stack. The inverse response filter can be, for example, a cut glass filter or an interference filter. The benefits and drawbacks of each type are as described above with respect to the original bandpass filter.

Figure 15A:
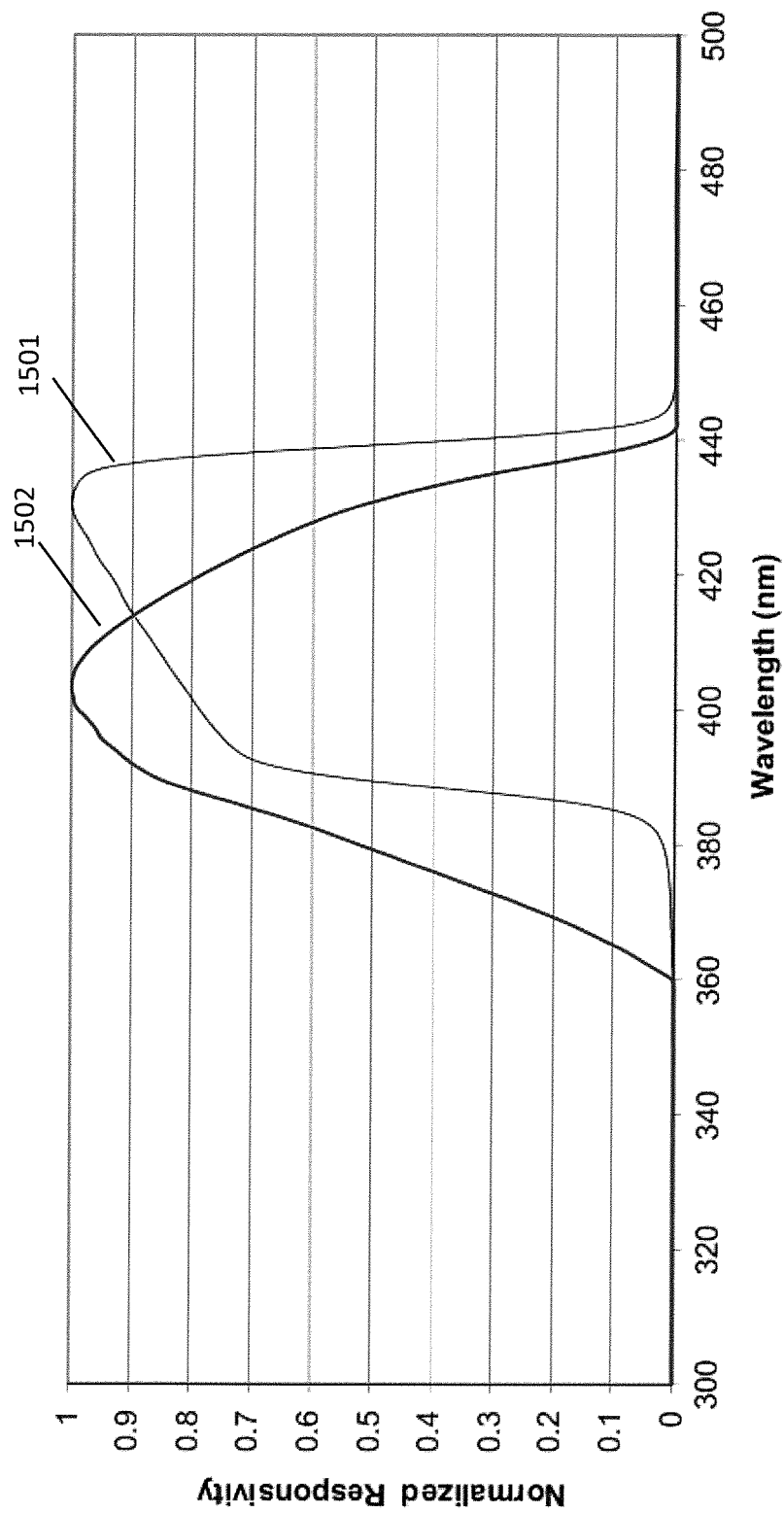
FIG. 15A is optical stack responses showing the deterioration of sharp cutoffs at the boundaries of the passband attributable to off normal incident UV light for an optical stack having a color interference filter.
Figure 15B:
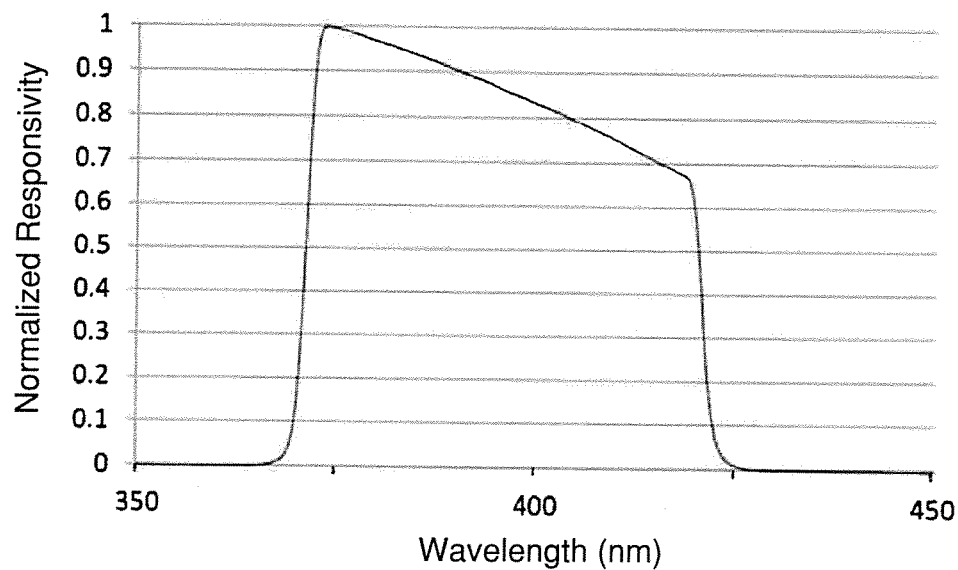
FIG. 15B is a representative response curve for an inverse response filter.
Figure 15C:
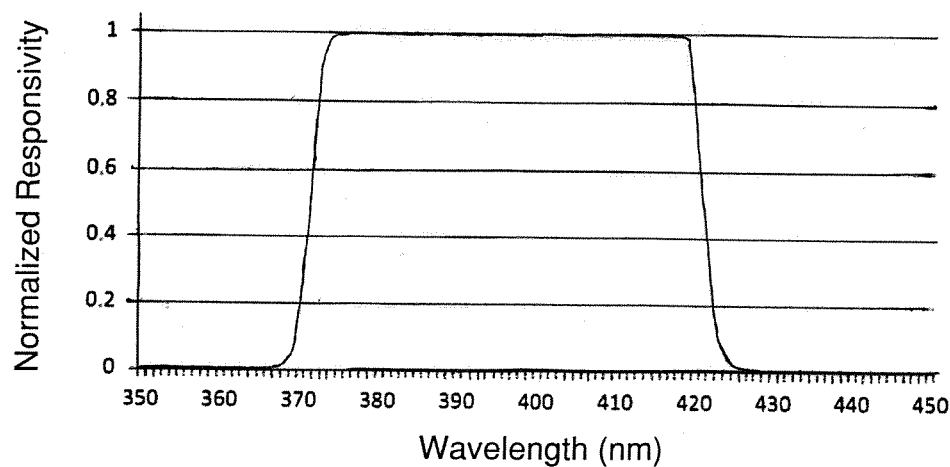
FIG. 15C is a representative optical stack response that includes the inverse response filter.

FIG. 15A, at trace 1501, shows a measured total optical stack response for an optical stack in which an inverse response filter has not yet been included (but the stack otherwise agrees with the diagram in FIG. 4). Trace 1501 has steep transitions at the cutoff frequencies but exhibits a response that is variable with wavelength within the passband. Noticeably, there is reduced responsivity with shorter wavelengths. An inverse response is essentially a mirror image of trace 1501. The mirrored trace is usable as a template for manufacturing an inverse response (interference) filter that is then added to the original optical stack that produced trace 1501. With the inverse response filter included, the total optical stack response becomes substantially rectangular. FIG. 15B shows an example response curve for an inverse response filter alone. FIG. 15C shows an example response curve for an entire optical stack after the inverse response filter has been included.

Photodetector

Figure 12:
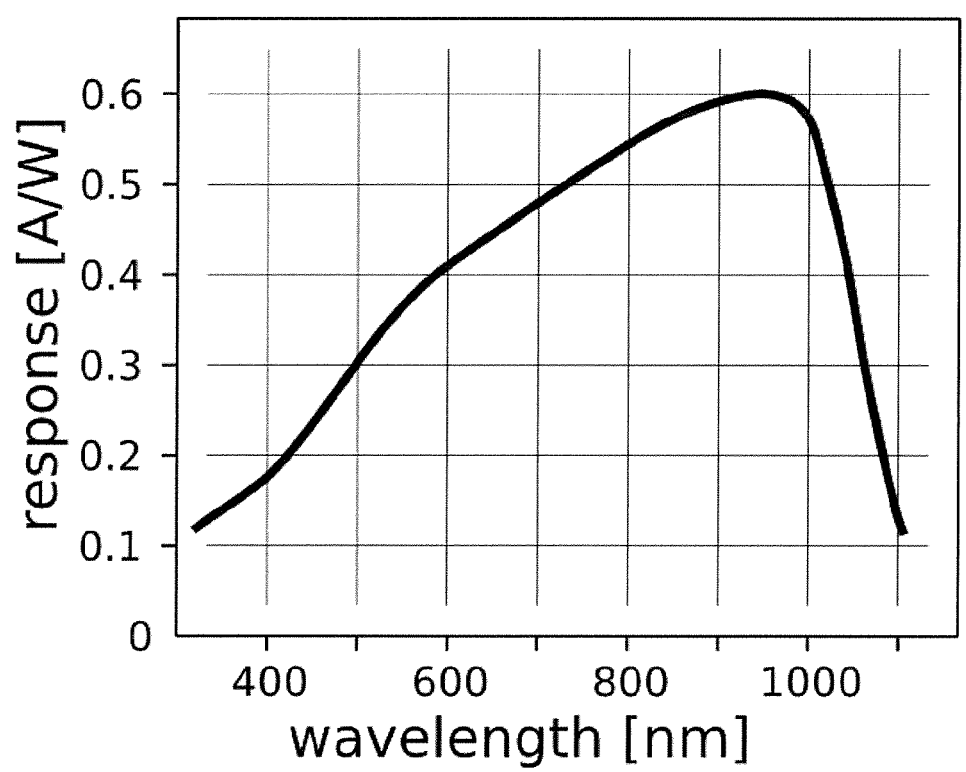
FIG. 12 is a responsivity curve for a representative silicon photodiode.

UV energy exiting the bandpass filter strikes the photodetector where it is converted to a current which is proportional to the intensity of the UV light striking it. An exemplary photodetector (i.e., photosensor) is a photodiode sensitive to UV wavelengths (e.g., wavelengths in the range of 250 nm to 400 nm). The photodetector characteristic is non constant with wavelength. A typical output current vs. wavelength (response curve) is shown in FIG. 12. The curve shown is for a silicon photodiode. However, the responsivity of most photodetector types such as Ge, GAsP, and silicon generally resemble each other in the UV range. That is, they are non-linear with wavelength, generally decreasing in responsivity at shorter wavelengths. In general, a single optical stack has a single photodetector. Alternatively, however, a single optical stack can contain more than one (e.g., two, three, four, an array of multiple, etc.) photodetectors. In such embodiments, the AOI control includes multiple apertures per plate, generally one aperture for each photodetector.

The output of the photodetector is passed to electronic circuitry 408 (FIG. 4). Electronic circuitry converts output current from the photodiode to a voltage proportional to the light incident on the photodiode. This signal voltage is converted to a digital form which is displayed on the face of the instrument and is also stored electronically in a non-volatile memory. Photodetectors or photodetector arrays are commercially available from firms such as Hamamatsu Photonics (Hamamatsu, Japan), OSI (Hawthorne, Calif.), and Vishay Intertechnology Inc. (Malvern, Pa.). Circuitry for digitizing their output signals are commercially available from companies such as EIT, LLC (Sterling, Va.). Such electronic circuitry is configurable or configured to control, for example, the time and rate of data collection and to digitize and store/display signals generated by each respective photodetector. The electronic circuitry 408 can output to a display 409, save the data on an internal computer storage medium (memory), and/or output to an external storage medium, processor, computer, or the like via one or more connection ports (e.g., USB port).

Optical Stack Operation

Figure 13A:
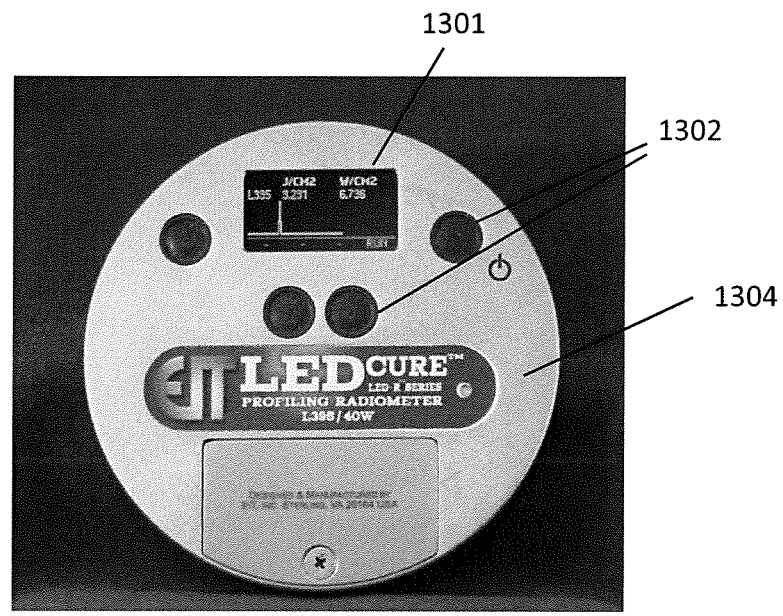
FIGS. 13A and 13B are exterior views of a representative radiometer including the user interface.
Figure 13B:
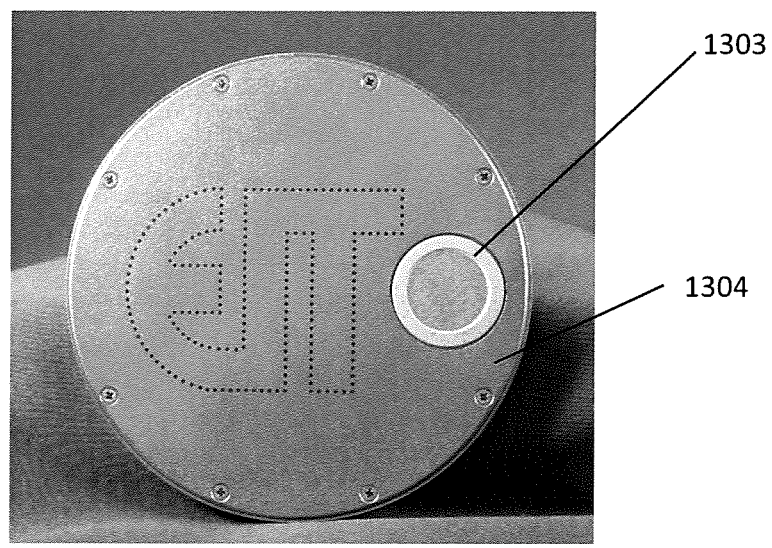

FIGS. 13A and 13B show exterior views of an example UV measuring instrument (radiometer). The display 1301 identifies, for example, one or more of the wavelength bands transmitted by the bandpass filter (e.g., UV-L395), integrated UV energy (Joules/cm$^2$), and peak irradiance (Watts/cm$^2$). The exterior generally includes user interface controls such as controls 1302 (e.g., buttons) for power, display output selection, and the like. FIG. 13B shows the opposite face of the instrument which includes the protective window 1303 of the optical stack. The remainder of the optical stack is encased by the housing 1304 which provides protection from foreign materials like dust and moisture as well as prevents stray light from entering the optical stack by any means other than passage through the protective window 1303. Suitable materials for the housing 1304 include aluminum, steel, or some other metal. Plastics which are suitable for repeated UV exposure may also be used. Overall dimensions of a typical radiometer are, for example, 4.5 inches in diameter and 0.5 inch in height.

A single radiometer comprises one or, alternatively, multiple (e.g., two, three, four, etc.) optical stacks within a single housing 1304. The same electronic circuitry 408 (FIG. 4) may be replicated for use with each of the optical stacks of a radiometer if desired in a particular embodiment.

In a radiometer, the components described above are stacked one atop the other so that energy falling on the instrument's protective window at the top of the optical stack ultimately generates a current output from the photodiode located at the bottom of the optical stack. This current is linearly converted to an output voltage proportional to the UV energy associated with the wavelengths which are transmitted by the various components that make up the optical stack.

The overall spectral response of a UV measurement system is generally estimated by generating the convolution of the individual components of the optical stack with each other or determined by direct measurement. In theory, convoluting the transmission % vs. wavelength plots for the individual optical components of an optical stack with each other provides a reasonable indication of a radiometer's spectral response curve. In practice, however, the actual response of the optical stack does not always follow this expectation. With the single plate and double plate methods of bandpass filtering and AOI control described above, actual optical stack response was not obvious from a mere convolution of response curves of the individual optical elements. The total optical stack response is determined by direct measurement in such circumstances.

Direct measurement of the response requires scanning the optical stack with individual wavelengths ranging from the shortest wavelength to the longest (e.g., from 200 nm to 1000 nm). The output of the photodetector (e.g., measured in amperes) is collected and divided by the input radiation (e.g., measured in watts) impinged on the optical stack. The result is a responsivity curve (e.g., in Amps/Watt) as a function of wavelength. Responsivity curves may also be normalized.

Figure 14:
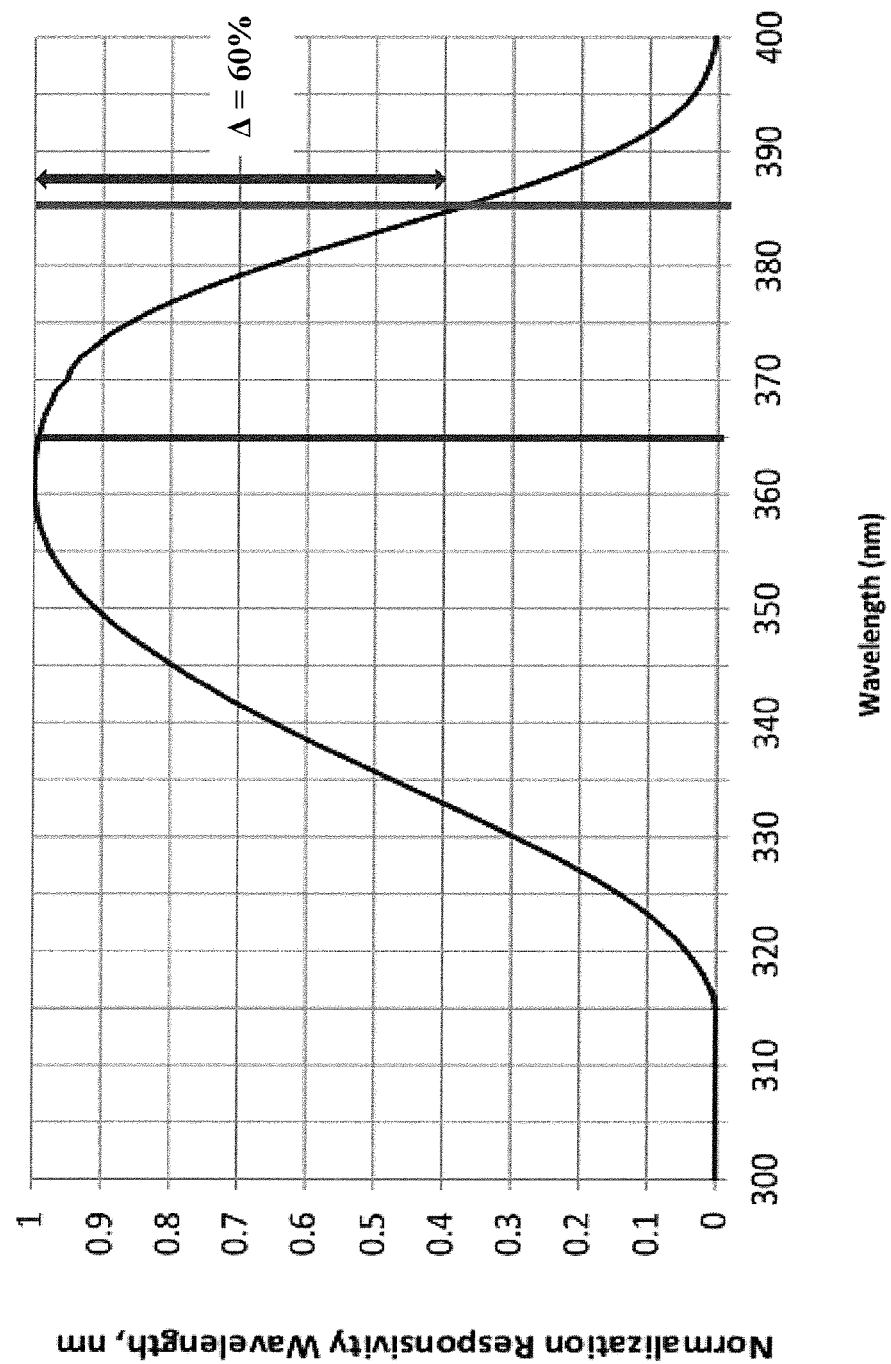
FIG. 14 is a responsivity curve for an optical stack containing a cut glass bandpass filter.

FIG. 14 provides a measured response curve for an actual radiometer which utilizes a cut glass filter as the bandpass filter. It is advertised as measuring the wavelength range from 320 to 390 nm. The curve demonstrates measurement difference between two different wavelengths (365 nm and 385 nm). A 60% error in responsivity is observed despite both wavelengths being within the passband of the filter. If an appreciable change in spectral make-up of the source being measured occurs, there is a substantial change in the associated measurement. For example, if a line source which is centered at 365 nm is measured and then compared to a 385 nm line source of the same intensity, there will be a 60% measurement error. Although the measurement is quite repeatable (e.g., to a few percent), it is not possible to obtain an absolute measurement with an error of at most a few percent over the entire passband. This type of measurement is useful only for relative measurements or in very selected situations.

In preferred embodiments, an interference filter (e.g., a color interference filter) is used for the bandpass filter. However, results can be far less than optimal without adequate control of angle of incidence (AOI). Interference filters only work well for small angles of incidence. In a traditional optical stack, if the AOI is too large (e.g., more than approximately fifteen degrees) the filter characteristics are unacceptably deteriorated (see, e.g., FIG. 9).

FIG. 15A shows, at trace 1501, the spectral response curve for a color interference filter and a detector which is illuminated with UV energy normal to the plane of the filter. Trace 1502 shows the spectral response of an optical stack which contains the same filter/detector combination but which is not compensated for off normal (non-perpendicular) illumination. That is, no provision has been made in the optical stack to correct for angle of incidence (AOI) errors. The trace 1502 responsivity curve varies considerably across the pass band, and the cutoff wavelengths are shifted toward shorter wavelengths. The measured responsivity curve does not match the result predicted by convolution of the individual components. In general, this performance is useful only in making relative measurements.

Angles of incidence of light striking the bandpass filter vary substantially because of the diffuser in the optical stack which, because of scattering, produces many angles of incidence from 0° to 90°. As a result, in traditional optical stacks and sensors employing interference filters, the original passband of the filter becomes distorted because of the multiple angles of incidence created by a diffuser. Other elements of an optical stack, such as a protective window, can also contribute to large angles of incidence for the bandpass filter because the window admits light from multiple angles.

By comparison, exemplary embodiments of radiometers and methods utilizing an optical stack such as described in connection with FIGS. 4, 10, and 11, provide a substantially rectangular response. Rectangular response means that amplitude response, as a function of wavelength, is nearly constant at a high percentage value in the passband and rapidly transitions to near zero outside the passband. Exemplary radiometers according to the teachings herein achieve absolute measurement of intensity with an absolute measurement error of at most a few percent (e.g., 3%) over the entire passband.

The AOI control (e.g., plate 1001 of FIG. 10 or plates 1104 and 1106 of FIG. 11) is configured to restrict AOI to the bandpass interference filter to such value that wavelength shift of the bandpass interference filter as detected by the photodetector is no greater than 2%, for example. Alternatively, the AOI control may be configured to restrict AOI to such value that wavelength shift is no greater than 1%. A wavelength shift of no greater than 1% or 2% is preferred. In some embodiments, this translates to restricting AOI preferably to 15° or less, more preferably 10° or less. The relationship between wavelength shift and AOI can be defined as follows:

$$\lambda_c = \lambda_o \sqrt{1 - \frac{(\sin\theta)^2}{n^2}}$$

wavelength shift (nm)=$|\lambda_o - \lambda_c|$ wavelength shift $$(\%) = \frac{|\lambda_o - \lambda_c|}{\lambda_o} * 100$$

where:
$\lambda_c$=shifted wavelength,
$\lambda_o$=central wavelength,
θ=angle of incidence (AOI),
n=index of refraction.

Some common indices of refraction for different glass types are, for example, between 1.46 and 1.62. As an example calculation, an interference filter with an index of refraction of 1.55 exposed to incident UV LED energy of $C_p$=395 nm having an AOI of 15° will exhibit a wavelength shift of approximately 5.5 nm, or 1.4% shift.

Figure 16:
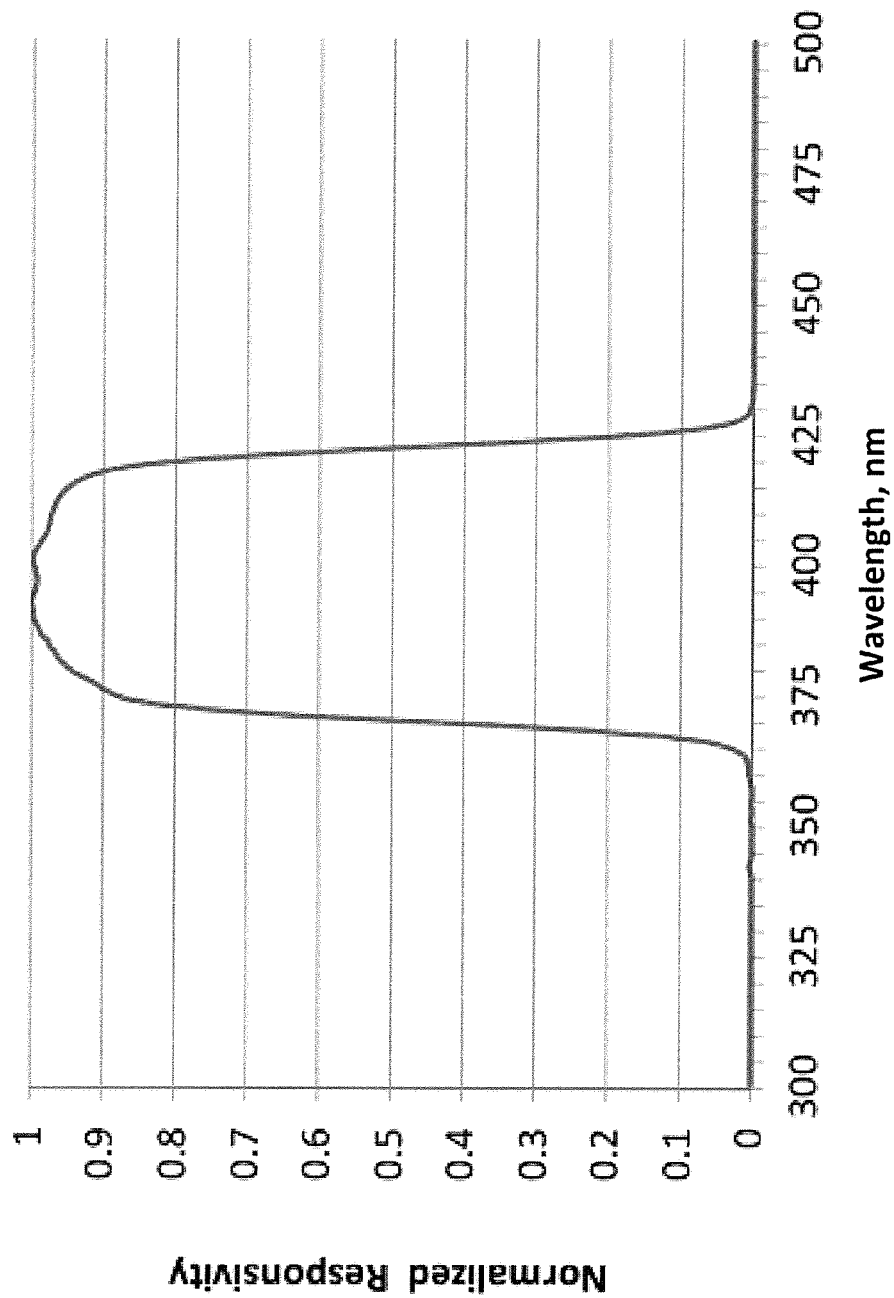
FIG. 16 shows an optical stack response for an exemplary UV radiometer measuring wavelength band L395.

FIG. 16 shows the response curve for an exemplary UV radiometer instrument measuring L395 (see Table 1 below). This is an actual measured response reflecting the combined effect of all optical components in the instrument. Note that the response is essentially flat across all wavelengths associated with a 395 nm source.

Embodiments of the invention are configured to accurately measure UV energy generated by UV LEDs. The wavelengths typically generated by UV LEDs are identified as the "L" bands, and their center wavelengths, denoted $C_p$, are centered at, for example, 365, 385, 395, and 405 nm as shown in Table 1. (Other $C_p$ wavelengths, such as 415 nm, exist and can be defined in like manner as the ones listed.) $C_p$ may vary by as much as +/−5 nm and still be within specification. The actual spectral distribution within an LED array may vary depending on how the LED arrays are binned. The bands listed in Table 1 are examples only. Additional bands and definitions exist or can be defined as desired. For a more detailed discussion of the "L" bands, see EIT paper, "Measurement of Ultraviolet Energy For UV LEDS. Proposed Band Definitions." EIT, LLC; Sterling Va. Jul. 1, 2015, herein incorporated by reference in its entirety.

TABLE 1

UV LED "L" Band Definitions.

| Band | Wavelengths, $C_p$ | Measurement Range |
| --- | --- | --- |
| L405 | 400-410 nm | 383-433 nm |
| L395 | 390-400 nm | 372-422 nm |
| L385 | 380-390 nm | 364-414 nm |
| L365 | 360-370 nm | 343-393 nm |

The measurement requirement for a given band is rectangular in shape and covers a range of approximately 50 nm for each band. A 50 nm band size captured 98% of the energy from UV LEDs tested. A band size of 50 nm or less is preferred. Alternatively, the bandpass filter may be configured for other passband sizes such as any size from 10 nm to 100 nm wide. Ability to implement the filter limits the ultimate maximum width, and ability to capture all of the LED wavelengths limits width in the narrow range. Proper choice of the width of the band allows the total optical response of the stack to be very well controlled and to be repeatable.

Figure 17:
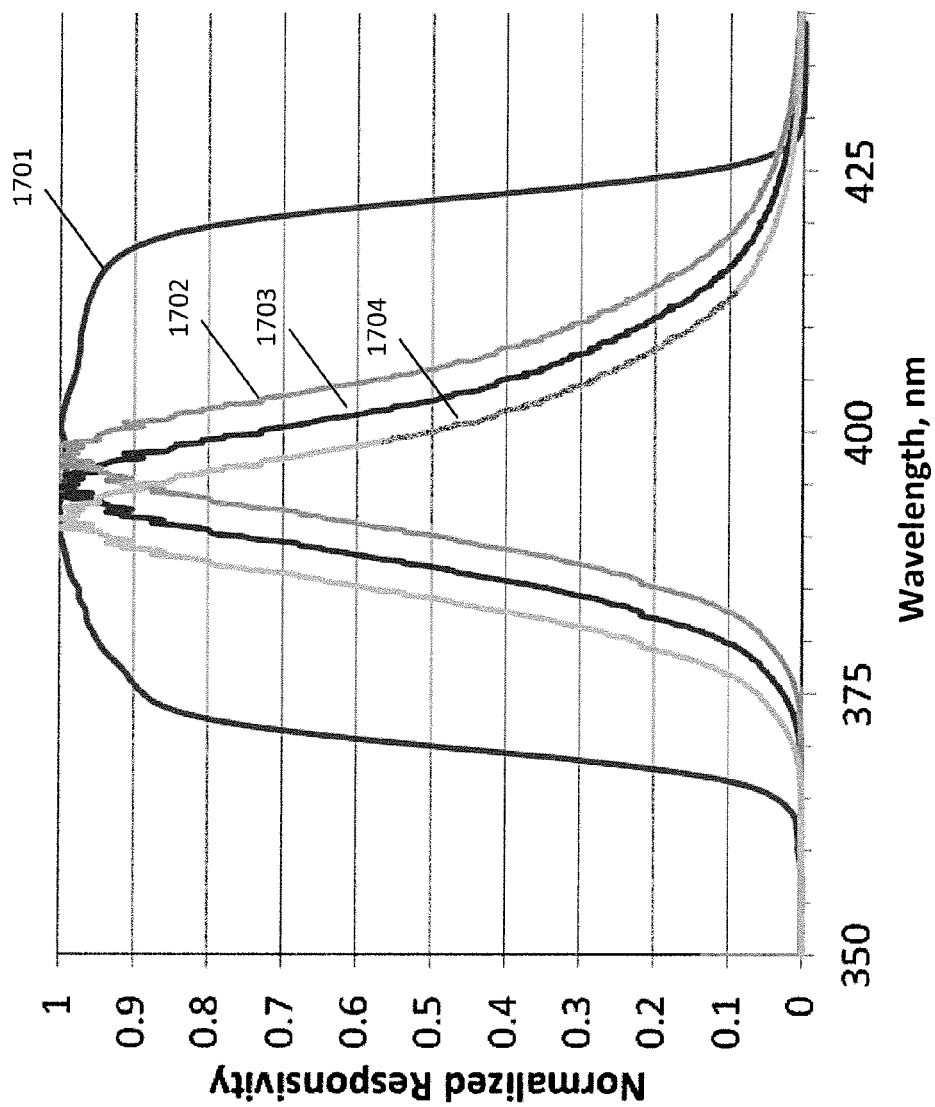
FIG. 17 shows the optical response for an exemplary UV radiometer with Lower, Median and Upper Limits of LED Spectra shown.

FIG. 17 shows the optical response for a L395 radiometer at trace 1701. Trace 1701 is the same trace as shown in FIG. 16, except the graph's x-axis limits have been reduce to provide greater resolution. The spectra for the LEDs used in an L395 UV source are imposed on it, and the upper (trace 1702), median (trace 1703), and lower (trace 1704) limits for $C_p$ are shown. The traces reflect that the individual LEDs may have a variation of +/−5 nm about nominal $C_p$ and to obtain all the LED generated energy in the L395 band the optical stack response must be slightly (+/−5 nm) wider than it would be if all LEDs had a nominal $C_p$ of 395 nm.

While exemplary embodiments described herein are especially well suited for measuring and characterizing the output of UV LEDs, such devices and methods are also appropriate for measuring the output of other UV sources such as traditional UV lamps. Embodiments disclosed herein are usable, for example, to measure and/or compare the spectral responses, the absolute energy output, and/or the absolute irradiance of two or more UV sources. This is true regardless of whether all of the two or more UV sources are UV LEDs, UV lamps, or some combination of UV sources.

While preferred and exemplary embodiments of the present invention have been disclosed herein, one skilled in the art will recognize that various changes and modifications may be made without departing from the scope of the invention as defined by the following claims.

We claim:

1. A UV radiometer or optical stack of a UV radiometer, comprising
a protective window;
a diffuser arranged to receive energy transmitted through the protective window;
a bandpass interference filter arranged after or below the diffuser, wherein the bandpass interference filter is configured to pass pre-selected UV wavelengths and reject other wavelengths;
a photodetector arranged to receive energy transmitted through the bandpass interference filter; and
an angle of incidence (AOI) control plate either separating the diffuser and the bandpass interference filter or separating the bandpass interference filter and the photodetector,
wherein the AOI control plate is configured to restrict or select AOI for energy passing through the bandpass interference filter and reaching the photodetector to such value that wavelength shift is no greater than 2%, and
wherein the UV radiometer is configured to measure one or more of the absolute quantities of energy and irradiance associated with the pre-selected UV wavelengths of a UV source.

2. The UV radiometer or optical stack of claim 1, wherein the AOI control plate is configured as a plate with an aperture of pre-selected diameter and height.

3. The UV radiometer or optical stack of claim 1, wherein the bandpass interference filter is configured to only pass a band of a pre-selected size range.

4. The UV radiometer or optical stack of claim 1, wherein the protective window is configured as an attenuator, or wherein the UV radiometer further comprises a purpose-built attenuator arranged to receive light transmitted through the protective window before it reaches the diffuser.

5. The UV radiometer or optical stack of claim 1, further comprising an inverse response filter for linearizing or leveling a spectral response.

6. A radiometry method for measuring absolute energy and irradiance of a UV source, comprising
admitting energy originating from the UV source to an optical stack using a protective window;
diffusing energy from the protective window using a diffuser;
filtering energy from the diffuser with a bandpass interference filter configured to pass pre-selected UV wavelengths and reject other wavelengths;
detecting energy from the bandpass interference filter using a photodetector;
controlling the angle of incidence (AOI) of energy passing through the bandpass interference filter and reaching the photodetector using one or more AOI control plates, each plate either separating the diffuser and the bandpass interference filter or separating the bandpass interference filter and the photodetector; and
determining one or more of the absolute quantities of energy and irradiance associated with the pre-selected UV wavelengths of the UV source based on an output of the photodetector,
wherein the AOI is restricted or selected in said controlling step to such value that wavelength shift is no greater than 2%.

7. The radiometry method of claim 6, further comprising attenuating light originating from the UV source using one or more of the protective window and a purpose-built attenuator.

8. The radiometry method of claim 6, wherein the admitting step admits light from a UV source that is a UV LED.

9. The radiometry method of claim 6, further comprising the step of linearizing or leveling a spectral response using an inverse response filter.

10. A UV radiometer or optical stack of a UV radiometer, comprising
a protective window;
a diffuser arranged to receive energy transmitted through the protective window;
a bandpass interference filter arranged after or below the diffuser, wherein the bandpass interference filter is configured to pass pre-selected UV wavelengths and reject other wavelengths;
a photodetector arranged to receive energy transmitted through the bandpass interference filter;
a first angle of incidence (AOI) control plate separating the diffuser and the bandpass interference filter; and
a second AOI control plate separating the bandpass interference filter and the photodetector,
wherein the first and second AOI control plates are configured to restrict or select AOI to such value that wavelength shift is no greater than 2%, and
wherein the UV radiometer is configured to measure one or more of the absolute quantities of energy and irradiance associated with the pre-selected UV wavelengths of a UV source.

11. The UV radiometer or optical stack of claim 10, wherein the first and second AOI control plates are configured as plates with respective first and second apertures of pre-selected diameters and heights.

12. The UV radiometer or optical stack of claim 10, wherein the bandpass interference filter is configured to only pass a band of a pre-selected size range.

13. The UV radiometer or optical stack of claim 10, wherein the first AOI control plate is mated with a first side of the bandpass interference filter, and the second AOI control plate is mated with a second side of the bandpass interference filter opposite the first side.

14. The UV radiometer or optical stack of claim 10, wherein the first AOI control plate, bandpass interference filter, and second AOI control plate form a sandwich structure 0.1 to 0.2 inch in size.

15. The UV radiometer or optical stack of claim 10, wherein the protective window is configured as an attenuator, or wherein the UV radiometer or optical stack further comprises a purpose-built attenuator arranged to receive light transmitted through the protective window before it reaches the diffuser.

16. The UV radiometer or optical stack of claim 10, further comprising an inverse response filter for linearizing or leveling a spectral response.

17. A radiometry method for characterizing a UV source, comprising
transmitting energy from the UV source through an optical stack comprising a bandpass interference filter configured to pass pre-selected UV wavelengths and reject other wavelengths; and
determining one or more of the absolute quantities of energy and irradiance associated with the pre-selected UV wavelengths of the UV source based on an output of a photodetector of the optical stack,
wherein the transmitting step conducts the energy from the UV source to the photodetector over an optical stack distance of 0.5 inch or less,
wherein the step of transmitting comprises
transmitting energy from the UV source through a diffuser;
transmitting energy from the diffuser through a first angle of incidence (AOI) control plate;
transmitting energy from the first AOI control plate through the bandpass interference filter;
transmitting energy from the bandpass interference filter through a second AOI control plate; and
transmitting energy from the second AOI control plate to the photodetector.

18. The radiometry method of claim 17, further comprising attenuating light originating from the UV source using one or more of a protective window and a purpose-built attenuator prior to energy reaching the diffuser.

19. A radiometry method for characterizing a UV source, comprising
transmitting energy from the UV source through an optical stack comprising a bandpass interference filter configured to pass pre-selected UV wavelengths and reject other wavelengths;
determining one or more of the absolute quantities of energy and irradiance associated with the pre-selected UV wavelengths of the UV source based on an output of a photodetector of the optical stack,
wherein the transmitting step conducts the energy from the UV source to the photodetector over an optical stack distance of 0.5 inch or less; and
linearizing or leveling a spectral response with an inverse response filter.

* * * * *